US009315126B2

(12) United States Patent
Tanner et al.

(10) Patent No.: US 9,315,126 B2
(45) Date of Patent: Apr. 19, 2016

(54) ENERGY-DISSIPATION SYSTEM

(71) Applicant: Dorel Juvenile Group, Inc., Foxboro, MA (US)

(72) Inventors: Alan Tanner, Taylors Lakes (AU); Kim Tat, South Melbourne (AU); Stephen B Oltman, Hope, IN (US); Meihui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/562,441

(22) Filed: Dec. 5, 2014

(65) Prior Publication Data

US 2015/0091344 A1    Apr. 2, 2015

Related U.S. Application Data

(63) Continuation-in-part of application No. 13/486,884, filed on Jun. 1, 2012, now Pat. No. 9,221,366.

(51) Int. Cl.
| B60N 2/28 | (2006.01) |
| B60N 2/42 | (2006.01) |
| B60N 2/427 | (2006.01) |

(52) U.S. Cl.
CPC ............ *B60N 2/2884* (2013.01); *B60N 2/2872* (2013.01); *B60N 2/4235* (2013.01); *B60N 2/4249* (2013.01); *B60N 2/42709* (2013.01)

(58) Field of Classification Search
CPC .. B60N 2/2884; B60N 2/4879; B60N 2/4235; B60N 2/42709
USPC .................................................... 297/216.11
See application file for complete search history.

(56) References Cited

U.S. PATENT DOCUMENTS

| 4,092,751 | A |   | 6/1978 | Burkholder et al. | |
| 4,265,484 | A |   | 5/1981 | Stalter | |
| 6,386,639 | B1 |  | 5/2002 | McMichael | |
| 6,623,075 | B2 |  | 9/2003 | Baloga et al. | |
| 7,246,852 | B2 |  | 7/2007 | Balensiefer | |
| 7,490,909 | B1 |  | 2/2009 | Haggman et al. | |
| 7,699,393 | B2 |  | 4/2010 | Forbes et al. | |
| 7,717,520 | B2 |  | 5/2010 | Boren et al. | |
| 7,726,734 | B2 |  | 6/2010 | Mahal et al. | |
| 7,744,154 | B2 |  | 6/2010 | Marsden et al. | |
| 7,850,234 | B2 | | 12/2010 | Marsden et al. | |
| 8,348,337 | B2 | * | 1/2013 | Franck ................. | B60N 2/2809 297/216.11 |
| 8,783,776 | B1 |   | 7/2014 | Perkins | |
| 2002/0175544 | A1 | * | 11/2002 | Goor .................... | B60N 2/2806 297/216.11 |
| 2004/0164529 | A1 | * | 8/2004 | Yoshida ............... | B60N 2/2809 297/216.11 |
| 2004/0169406 | A1 | * | 9/2004 | Yoshida ............... | B60N 2/2812 297/216.11 |
| 2007/0257542 | A1 |   | 11/2007 | Marshall et al. | |
| 2009/0066125 | A1 |   | 3/2009 | Nett et al. | |
| 2011/0067183 | A1 |   | 3/2011 | Hawkins | |

FOREIGN PATENT DOCUMENTS

AU    WO 2011054063    *    5/2011    ........... B60N 2/2884

* cited by examiner

*Primary Examiner* — Anthony D Barfield
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

40 Claims, 29 Drawing Sheets

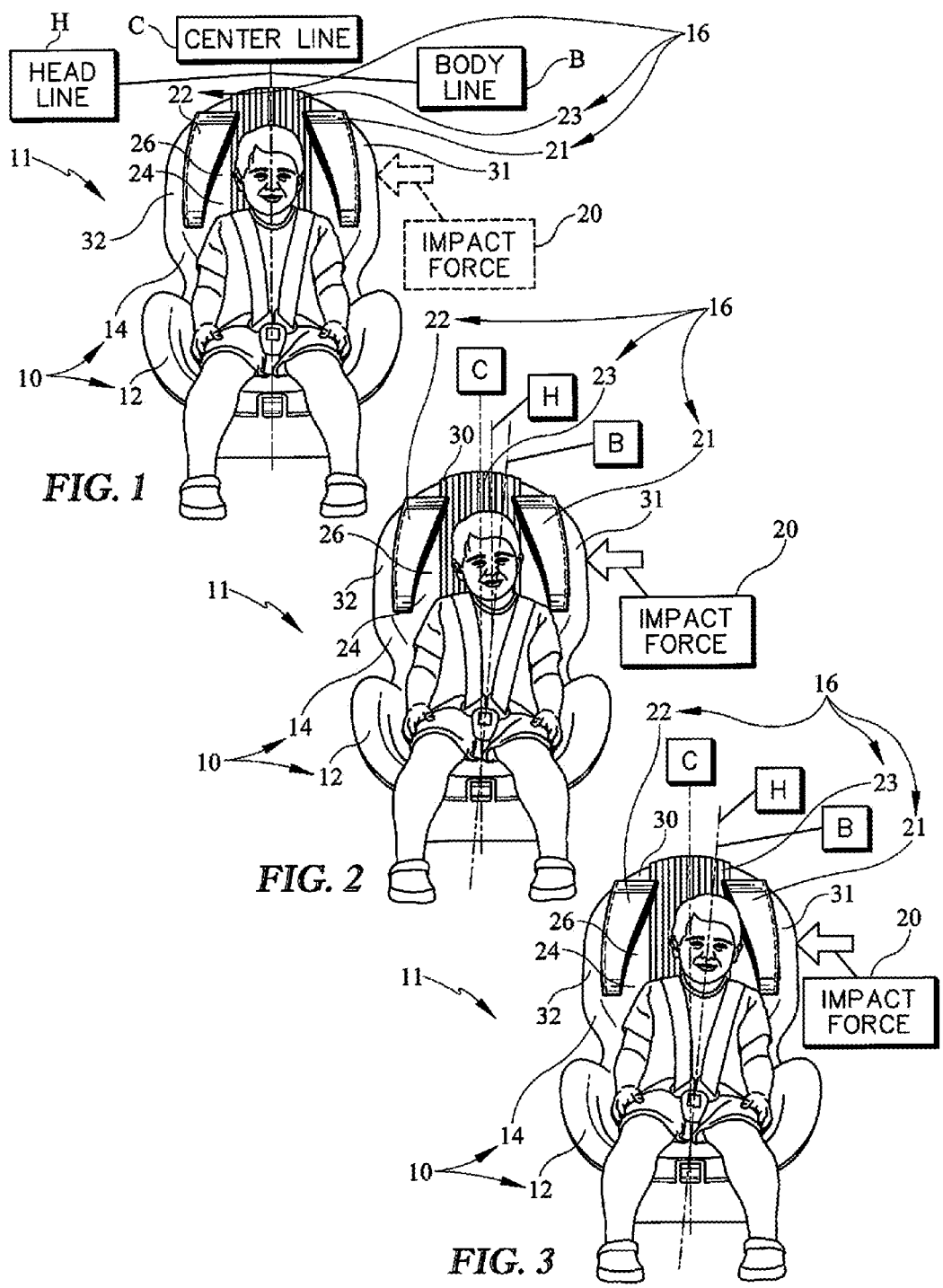

ENERGY-DISSIPATION SYSTEM

PRIORITY CLAIM

This application is a continuation-in-part of U.S. application Ser. No. 13/486,884, filed Jun. 1, 2012 now U.S. Pat. No. 9,221,366 and claims priority to Australian Application No. AU 2013267054, filed Dec. 5, 2013.

BACKGROUND

The present disclosure relates to an energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in g's. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in g's.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the juvenile vehicle seat includes a seat bottom and a seat back. The seat back includes an interior surface facing toward the seat bottom and an exterior surface facing away from the seat bottom. The energy-dissipation system is coupled to the exterior surface of the seat back in one embodiment and also to the interior surface of the seat back in another embodiment.

In illustrative embodiments, the seat back includes a backrest arranged to extend upwardly away from the seat bottom and a headrest coupled to the backrest. The headrest includes a rear panel coupled to an upper portion of the backrest, a first side-wing panel coupled to a first side of the rear panel, and a second side-wing panel coupled to an opposite second side of the rear panel.

In illustrative embodiments, the energy-dissipation system is coupled only to the exterior portion of the seat back. For example, the energy-dissipation system is coupled to exterior portions of the first and second side-wing panels. In illustrative embodiments, the energy-dissipation system is also coupled to interior portions of the first and second side-wing panels.

In illustrative embodiments, the seat back also includes a third side-wing panel located below and adjacent to the first side-wing panel and adjacent to a first side of the seat bottom. An upper portion of the third side-wing panel is coupled to a lower portion of the first side-wing panel. A lower portion of the third side-wing panel is coupled to the first side of the seat bottom. In one illustrative embodiment, the energy-dissipation system is also coupled to exterior portions of the third side-wing panel. In another illustrative embodiment, the energy-dissipation system is also coupled to interior and exterior portions of the third side-wing panel.

In illustrative embodiments, the seat back also includes a fourth side-wing panel located below and adjacent to the second side-wing panel and adjacent to a second side of the seat bottom. An upper portion of the fourth side-wing panel is coupled to a lower portion of the second side-wing panel. A lower portion of the fourth side-wing panel is coupled to the second side of the seat bottom. In one illustrative embodiment, the energy-dissipation system is also coupled to exterior portions of the fourth side-wing panel. In another illustrative embodiment, the energy-dissipation system is also coupled to interior and exterior portions of the fourth side-wing panel.

In illustrative embodiments, the energy-dissipation system includes a first force dissipater configured to provide means for absorbing external energy applied to the juvenile vehicle seat. The first force dissipater is coupled to the first and third side-wing panels included in the seat back.

In illustrative embodiments, the energy-dissipation system also includes a second force dissipater. The second force dissipater is coupled to second and fourth side-wing panels included in the seat back and is arranged to lie in spaced-apart relation to the first force dissipater.

In illustrative embodiments, the first force dissipater includes a first ride-down pad and a first pad foundation. The first pad foundation is configured to provide means for supporting the first ride-down pad in spaced-apart relation to the first and third side-wing panels of the seat back. The first ride-down pad is coupled to the first pad foundation and arranged to extend away from the first and third side-wing panels. In illustrative embodiments, the first ride-down pad includes an array of crush strips. Each crush strip of the ride-down pad includes a series of polygon-shaped structures coupled to one another to establish a crush strip. The series of polygon-shaped structures are illustratively hexagon-shaped but may be any other suitable shape such as, but not limited to, triangular or square. Circle-shaped structures are also within the scope of the present disclosure.

In illustrative embodiments, the second force dissipater includes a second ride-down pad and a second pad foundation similar in size, shape, and pattern to the ride-down pad and pad foundation of the first force dissipater. The second pad foundation is configured to provide means for supporting the second ride-down pad in spaced-apart relation to the second and fourth side-wing panels. The second ride-down pad includes an array of crush strips similar in size, shape, and pattern to the array of crush strips included in the first ride-down pad of the first force dissipater.

In illustrative embodiments, each force dissipater is a monolithic element made of a plastics material and is formed to include a hollow shell having a generally convex outer surface arranged to face away from the juvenile vehicle seat and a generally concave inner surface arranged to face toward the juvenile vehicle seat. Each force dissipater also includes at least one inwardly projecting crush strip cantilevered to a portion of the concave inner surface of the hollow shell. In illustrative embodiments, the inwardly projecting crush strip comprises several hexagonal-shaped sleeves. A triangle-shaped array of three hexagonal-shaped sleeves defines an inwardly projecting crush strip associated with a portion of the hollow shell that is arranged to lie adjacent to a seat bottom included in the juvenile vehicle seat. A diamond-shaped array of four hexagonal-shaped sleeves defines an inwardly projecting crush strip associated with a portion of the hollow shell that is arranged to lie adjacent to a backrest and headrest of a seat back included in the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a first embodiment of a child restraint including a juvenile vehicle seat having a seat bottom for an occupant or child to sit on and a seat back extending upwardly from the seat bottom, the seat back including a backrest and a headrest coupled to the backrest, the juvenile seat also including an energy-dissipation system in accordance with the present disclosure coupled to the headrest, the energy-dissipation system including a first pad foundation mounted on a first side-wing panel of the headrest, a first ride-down pad coupled to the first pad foundation, a second pad foundation mounted on a second side-wing panel of the headrest, and a second ride-down pad coupled to the second pad foundation and suggesting that the head and body of the occupant are substantially aligned with a center line of the juvenile vehicle seat in a position associated with normal riding conditions and the energy-dissipation system is configured to minimize the movement of the child's head and upper body when the juvenile vehicle seat is subject to an impact force (dashed arrow) as seen in FIGS. 2 and 3;

FIG. 2 is a front perspective view of the child restraint of FIG. 1 just after an impact force (solid arrow) has been applied to the juvenile vehicle seat and showing that such force causes an upper body or shoulder portion of a child sitting in the juvenile vehicle seat to move in a direction opposite of the impact force relative to the juvenile vehicle seat such that the child's body line is no longer aligned with the center line of the juvenile vehicle seat and the child's upper body or shoulder portion engages with a lower, concave surface of the first ride-down pad to slow the movement of the child's upper body portion and absorb some of the energy from such movement, the child's head also moves in the direction opposite of the impact force relative to the juvenile vehicle seat as the motion of the child's upper body portion pulls the child's head toward the first ride-down pad such that the child's head line is also no longer aligned with the center line of the juvenile vehicle seat;

FIG. 3 is a front perspective view of the child restraint of FIG. 2 but at a point in time that is after FIG. 2, showing that the child's head line has aligned with the child's body line and the head of the child sitting in the juvenile vehicle seat has engaged with a upper, convex surface of the first ride-down pad that is further away from the first side-wing panel of the headrest than the lower, concave surface of the first ride-down pad, the child's head has engaged with the upper, convex surface of the first ride-down pad to slow movement of the child's head in the direction opposite of the impact force and absorb some of the energy from such movement, and the child's upper body or shoulder portion also is still engaged with the lower, concave surface of the first ride-down pad;

FIG. 6A is a front elevation view of the child restraint and showing a child in the juvenile vehicle seat and that the child restraint includes the energy-dissipation system and the child's head and upper body portion being positioned between the first ride-down pad and the second ride-down pad prior to an impact force (dashed arrow) being applied to the child restraint, and suggesting that the child's head and upper body is aligned with and existing along a center-line axis that is generally perpendicular to the seat bottom of the juvenile vehicle seat;

FIG. 6B is a front elevation view of the child restraint of FIG. 6A just after an impact force (solid arrow) has been applied to the child restraint and showing that the child's upper body or shoulder has engaged with the first ride-down pad as a result of the impact force being applied to the child restraint in a direction opposite of the movement of the child's upper body and suggesting that the child's head is also moving in a direction toward the first ride-down pad such that both the child's head and body lines are not aligned with the center-line axis;

FIG. 6C is a front elevation view of the child restraint of FIG. 6A at a point in time just after the view in FIG. 6B, showing that the impact force (solid arrow) causes the child's head to engage with the first ride-down pad in addition to the child's upper body and suggesting that the child's head and upper body are angled toward the first ride-down pad with respect to the center-line axis as a result of the impact force and showing the first ride-down pad engages with the child's head at a point closer to the center-line axis than the distance between the center-line axis and the first side-wing panel of the vehicle seat;

FIG. 6D is a front elevation view of the child restraint of FIG. 6A at a point after the impact force is no longer applied to the child restraint and the child restraint is subject to a recoil or deflection force (solid arrow) as the vehicle comes to a stop and suggesting that the recoil force is applied in a direction opposite of the direction the child's body and head travelled as a result of the impact force and that the recoil force causes the child's head and body to be moved in the direction of the recoil force;

FIG. 6E is a front elevation view of the child restraint of FIG. 6A at a point after the view in FIG. 6D showing the recoil force (solid arrow) has caused the child's body line to shift from angling toward the first side-wing panel to angling toward the second side-wing panel and suggesting that the child's shoulder has engaged with the second ride-down pad as a result of the recoil force being applied in a similar but opposite manner as that of the impact force in FIG. 6B, and showing the child's head line is still slightly angled toward the first side-wing panel;

FIG. 6F is a front elevation view of the child restraint of FIG. 6A at a point just after the view in FIG. 6E, showing the recoil force (solid arrow) causes the child's head line to shift from angling toward the first side-wing panel to angling toward the second side-wing panel, the child's head engaging with the second ride-down pad in addition to the child's upper body portion and suggesting that the child's head line and body line is again aligned and angled with respect to the center-line axis as a result of the recoil force, and showing that the angular distance the child's head line travels from FIG. 6E to FIG. 6F due to the recoil force is less than the angular distance between the child's head line in FIG. 6E and the second side-wing panel of the juvenile vehicle seat;

FIG. 27 is a front elevation view of a first force dissipater;

FIG. 28 is a front perspective view of the first force dissipater of FIG. 27;

FIG. 29 is a rear elevation view of the first force dissipater of FIGS. 27 and 28;

FIG. 30 is a first rear perspective view of the first force dissipater of FIGS. 27-29; and FIG. 31 is a second rear perspective view of the first force dissipater of FIGS. 27-30.

DETAILED DESCRIPTION

Figure 18:
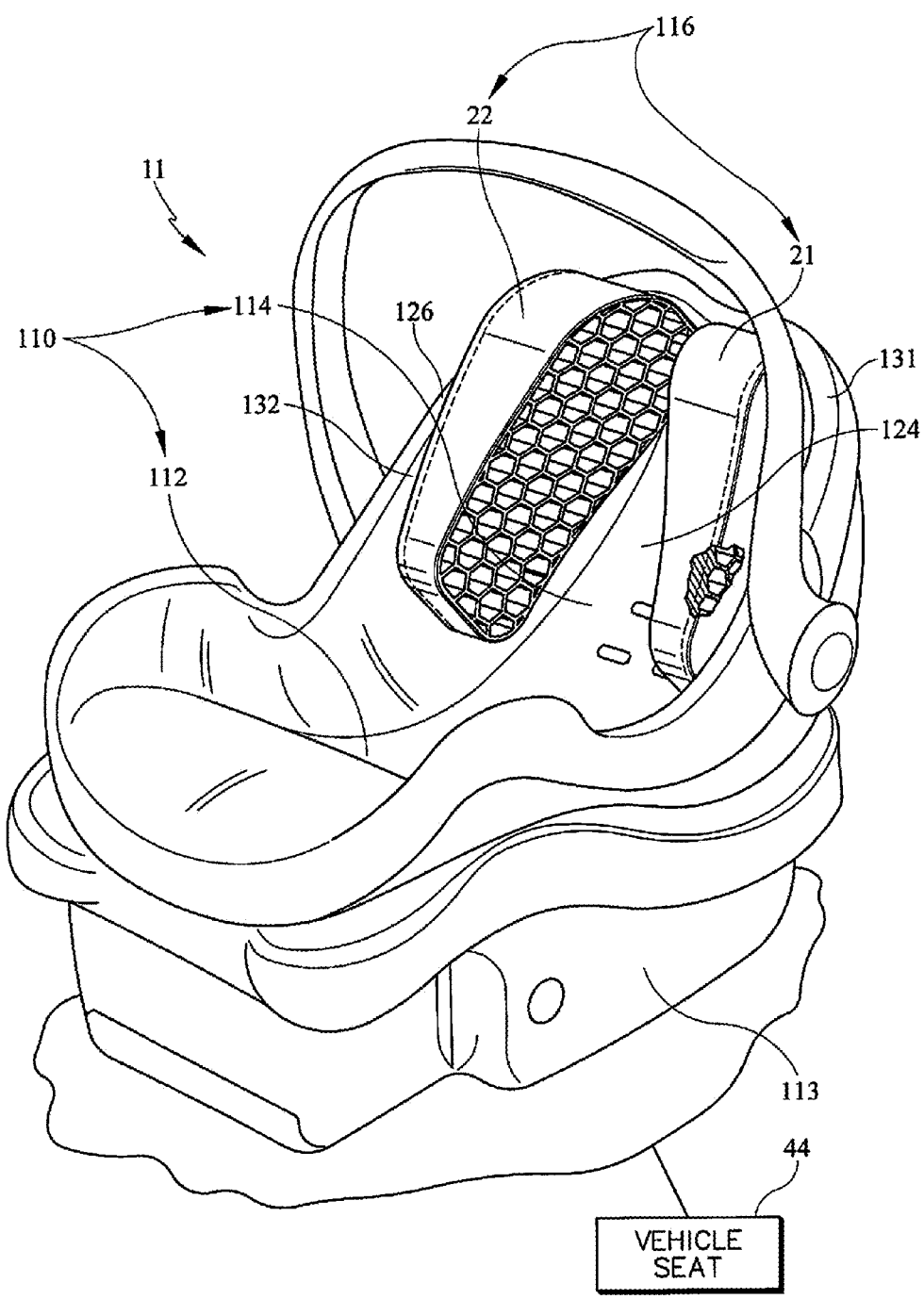
FIG. 18 is a perspective view of a second embodiment of a child restraint including a juvenile vehicle seat for supporting an infant and having a seat bottom and a seat back extending upwardly from the seat bottom, a base adapted to set on an underlying seat in a vehicle and support the juvenile vehicle seat, and an energy-dissipation system in accordance with another embodiment of the present disclosure coupled to the seat back and showing that the seat back comprises a backrest coupled to the seat bottom and a headrest coupled to the backrest and that the energy-dissipation system comprises a first pad foundation mounted on an inner wall of a first side-wing panel included in the headrest and coupled to a first ride-down pad and a second force pad foundation mounted on an inner wall of an opposite, second side-wing panel included in the headrest and coupled to a second ride-down pad.
Figure 19:
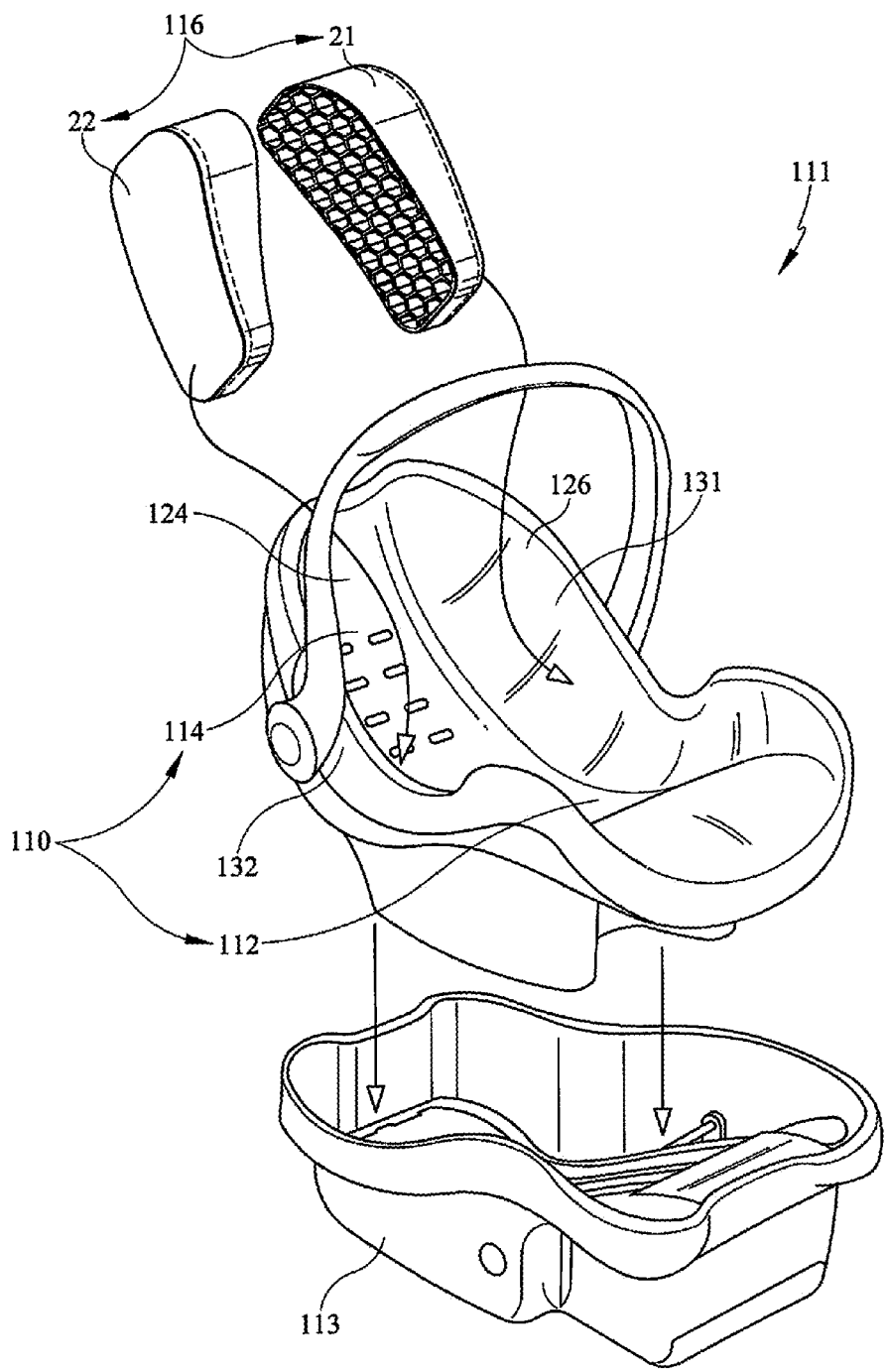
FIG. 19 is an exploded perspective assembly view of the child restraint of FIG. 18 showing that the child restraint includes, from top to bottom, an energy-dissipation system comprising two force dissipaters, a juvenile seat, and a seat-support base and suggesting that a first pad foundation included in a first force dissipater is coupled to an inner wall of a first side-wing panel included in a headrest of the juvenile seat and that a second pad foundation included in the second force dissipater is coupled to an inner wall of a second side-wing panel included in the headrest of the juvenile seat.

A child restraint 11 in accordance with a first embodiment of the present disclosure is shown in FIGS. 1-5 and comprises a juvenile vehicle seat 10 and an energy-dissipation system 16 that is coupled to the juvenile vehicle seat 10. A child restraint 111 in accordance with a second embodiment of the present disclosure is illustrated in FIGS. 18 and 19 and comprises a juvenile vehicle seat 110 and an energy-dissipation system 116 that is coupled to the juvenile vehicle seat 110. A child restraint 311 in accordance with a third embodiment of the present disclosure is shown in FIGS. 20-26 and comprises a juvenile seat 310 and an energy-dissipation system 316 that is coupled to juvenile seat 310. A monolithic energy-dissipation system 416 comprising a monolithic first-force dissipater 421 in accordance with another embodiment of the present disclosure is illustrated in FIGS. 27-31. It is within the scope of the present disclosure to mount energy-dissipation systems 16, 116, 316, and 416 on a juvenile seat or other device to dissipate energy transferred to such a seat or apparatus by means of an external impact force applied to the seat or apparatus.

Figure 4:
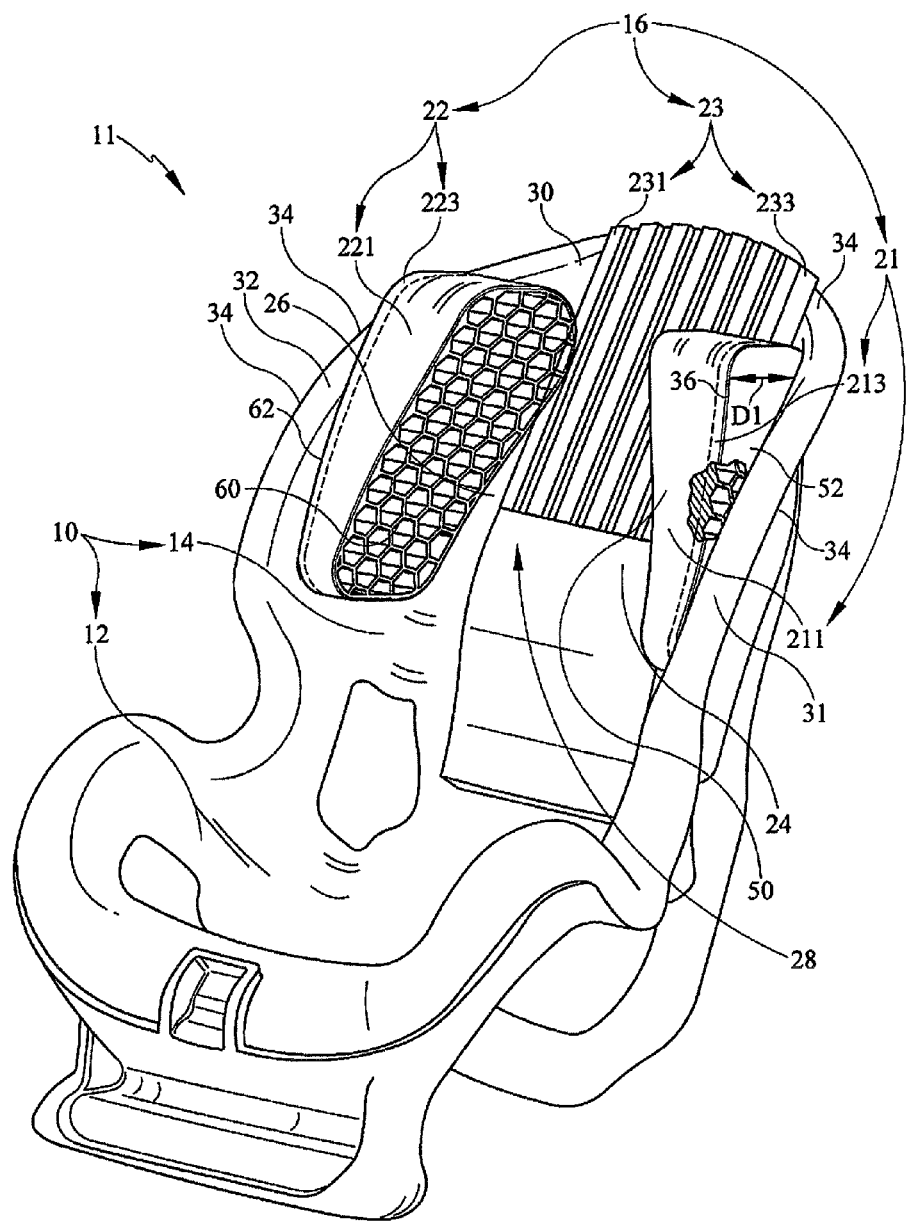
FIG. 4 is a front-left perspective view of the child restraint of FIGS. 1-3 and more clearly shows that the juvenile vehicle seat has a seat bottom and a seat back extending upwardly from the seat bottom and the energy-dissipation system is coupled to the seat back, and showing that the seat back comprises a backrest coupled to the seat bottom and a headrest coupled to the backrest and showing that the energy-dissipation system comprises a first pad foundation mounted on an inner wall of a first side-wing panel included in the headrest, a first ride-down pad coupled to the first pad foundation and extending away from the first side-wing panel, a second pad foundation mounted on an inner wall of an opposite, second side-wing panel included in the headrest, a second ride-down pad coupled to the second pad foundation and extending away from the second side-wing panel, a third pad foundation mounted on a forward-facing wall of a rear panel extending between the first and second side-wing panels and included in the headrest and coupled to the backrest, and a third ride-down pad coupled to the third pad foundation and extending away from the rear panel.
Figure 5:
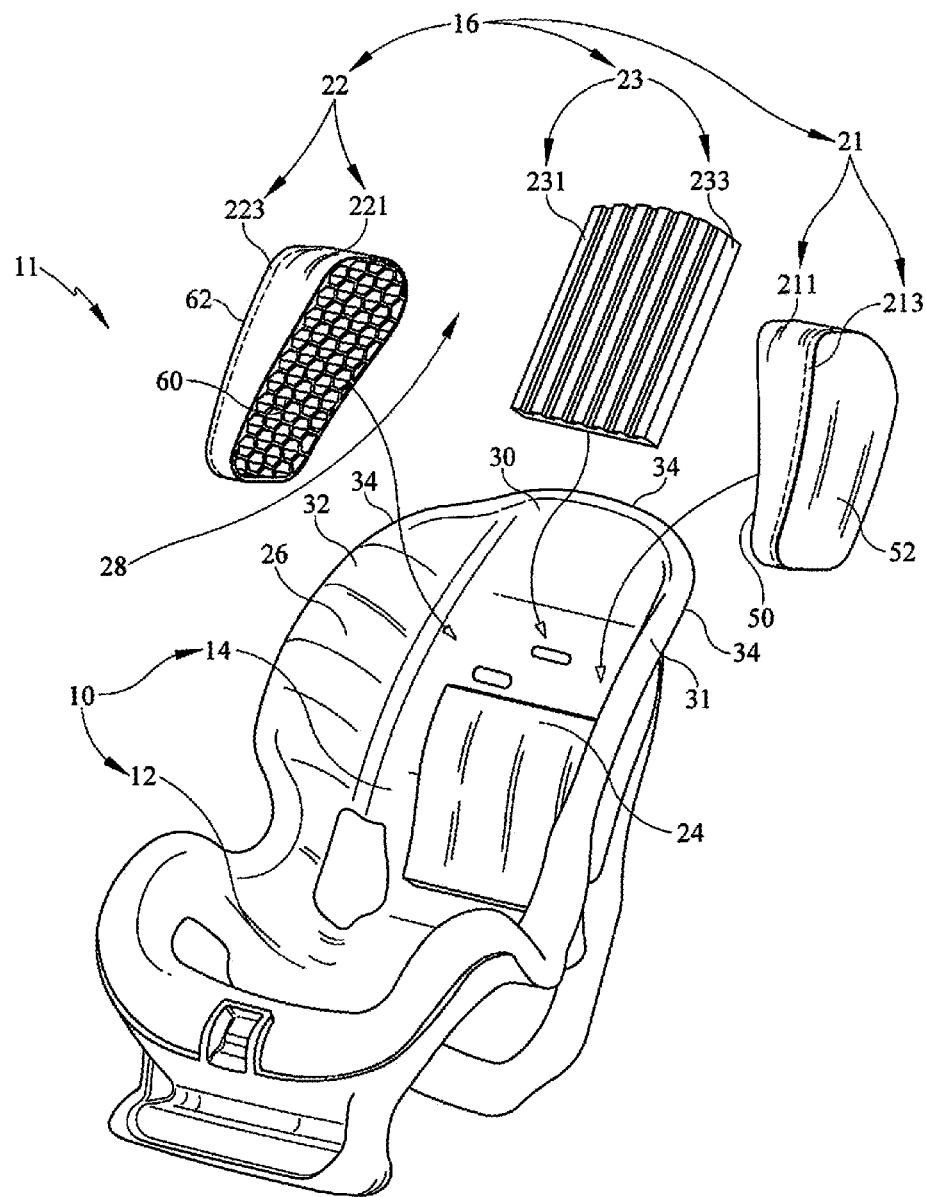
FIG. 5 is an exploded perspective assembly view of the child restraint of FIG. 4 showing that the child restraint includes, from top to bottom, an energy-dissipation system comprising three force dissipaters and a juvenile seat comprising a seat bottom and a seat back including a backrest and a headrest and suggesting that the first force dissipater is mountable on a first side-wing panel of the headrest, the second force dissipater is mountable of a second side-wing panel of the headrest, and the third force dissipater is mountable on a rear panel of the headrest that is coupled to an upper portion of the backrest.

Child restraint 11 includes juvenile vehicle seat 10 and energy-dissipation system 16 as shown in FIGS. 1-5. In illustrative embodiments, juvenile vehicle seat 10 includes a seat bottom 12 and a seat back 14 extending upwardly away from seat bottom 12. Energy-dissipation system 16 is coupled to seat back 14 of juvenile vehicle seat 10 as shown in FIG. 4 and suggested in FIG. 5. Energy-dissipation system 16 comprises first, second, and third force dissipaters 21, 22, 23 that are designed to minimize the g-loads experienced by a child seated on seat bottom 12 of juvenile vehicle seat 10 during exposure of juvenile vehicle seat 10 to an external impact force 20.

As suggested in FIG. 4, energy-dissipation system 16 comprises a first force dissipater 21, a second force dissipater 22, and a third force dissipater 23. In the illustrated embodiment, energy-dissipation system 16 is coupled to seat back 14 of juvenile vehicle seat 10, and, in particular, to a headrest 26 included in seat back 14. In illustrative embodiments, energy-dissipation system 16 is mounted on an inside portion of juvenile vehicle seat 10 as suggested, for example, in FIGS. 4 and 5. It is within the scope of the present disclosure to couple one or more of the energy dissipaters included in energy-dissipation system 16 on other portions of juvenile vehicle seat 10 or other juvenile seat or device to facilitate absorption of energy caused by external impact forces applied to such seats or devices. It is also within the scope of the present disclosure to vary the number of force dissipaters coupled to juvenile vehicle seat.

In the illustrated embodiment, seat back 14 of juvenile vehicle seat 10 includes a backrest 24 arranged to extend upwardly from seat bottom 12 and a headrest 26 coupled to an upper portion of backrest 24 and arranged to lie in spaced-apart relation to seat bottom 12. As shown in FIGS. 1 and 2, headrest 26 is coupled to backrest 24 in a fixed position. First force dissipater 21 is coupled to an inner wall of a first side-wing panel 31 included in headrest 26. Second force dissipater 22 is coupled to an inner wall of a second side-wing panel 32 included in headrest 26 to lie in spaced-apart confronting relation to first force dissipater 21 as suggested in FIGS. 1 and 1A. Third force dissipater 23 is coupled to an inner wall of a rear panel 30 as shown in FIG. 1. Third force dissipater 23 is arranged to lie and extend between first and second force dissipaters 21, 22. It is also within the scope of the present disclosure to provide a seat back comprising a headrest mounted on the backrest for up-and-down movement relative to the backrest.

As illustrated in FIGS. 1-3 and 6A-6F, energy-dissipation system 16 is configured to absorb energy from external impact forces 20 by providing means for deforming the first, second, and/or third force dissipaters 21, 22, and/or 23 at a predetermined rate when exposed to the external impact force 20 so that they first, second, and/or third force dissipaters 21, 22, and/or 23 absorb external energy associated with the external impact force 20 to reduce g-loads experienced by a child seated in the juvenile vehicle seat 10. First, second, and/or third force dissipaters 21, 22, and/or 23 are configured to deform at a predetermined deformation rate when exposed to the external impact force 20. The resulting deformation reduces the impact of the child's head as it is moves in the direction the side-wing panel 31, 32. The deformation also minimizes the acceleration of the child's head in the direction opposite of the impact force 20 during a subsequent recoil force 18.

Energy-dissipation system 16 minimizes acceleration of a child's head by reducing the distance of travel for a child's head and by absorbing impact energy to minimize deflection forces after a child's head has impacted energy-dissipation system 16. As seen in FIGS. 1-3, under normal riding conditions, the head and body of a child riding in the juvenile vehicle seat 10 align with a center-line axis C of juvenile vehicle seat 10. As show in FIGS. 1-3, center-line axis C is substantially perpendicular to the seat bottom 12 of juvenile vehicle seat 10.

As illustrated in FIGS. 1-3, the angle and movement of the head and body of a child seated in juvenile vehicle seat 10 can be represented in part by a head-line axis H and a body-line axis B. For example, head-line axis H in FIGS. 1-3 identifies an axis that extends through the middle of the child's head and substantially represents the vertical center of mass for the child's head. Similarly, body-line axis B in FIGS. 1-3 identifies an axis that extends through the middle of the child's body and substantially represents the vertical center of mass for the child's body. Prior to a collision, the child's head-line axis H and body-line axis B are coplanar with center-axis line C.

During a collision or other incident, application of an external impact force 20 to juvenile vehicle seat 10 causes juvenile vehicle seat 10 to move in the direction of impact force 20 relative to an occupant. As a result of this movement, the occupant's head-line axis H and body-line axis B move toward first force dissipater 21. Such movement causes occupant to move toward and engage first force dissipater 21. This impact causes energy to be transferred from the impacting object (such as the occupant's head) to first force dissipater 21, as suggested in FIGS. 1-4. First force dissipater 21 absorbs that transferred energy to minimize the magnitude of a resulting force applied to a child seated in juvenile vehicle seat 10 during the collision. First force dissipater 21 functions to minimize the g-loads (acceleration) experienced by the child seated on seat bottom 12 of juvenile vehicle seat 10 during exposure of juvenile vehicle seat 10 to external impact force 20 as suggested in FIGS. 1-3. First force dissipater 21 also functions to maximize the time interval (i.e., ride-down time) between the moment the impacting object strikes force dissipater 21 and the moment that resulting force reaches zero.

Figure 6:
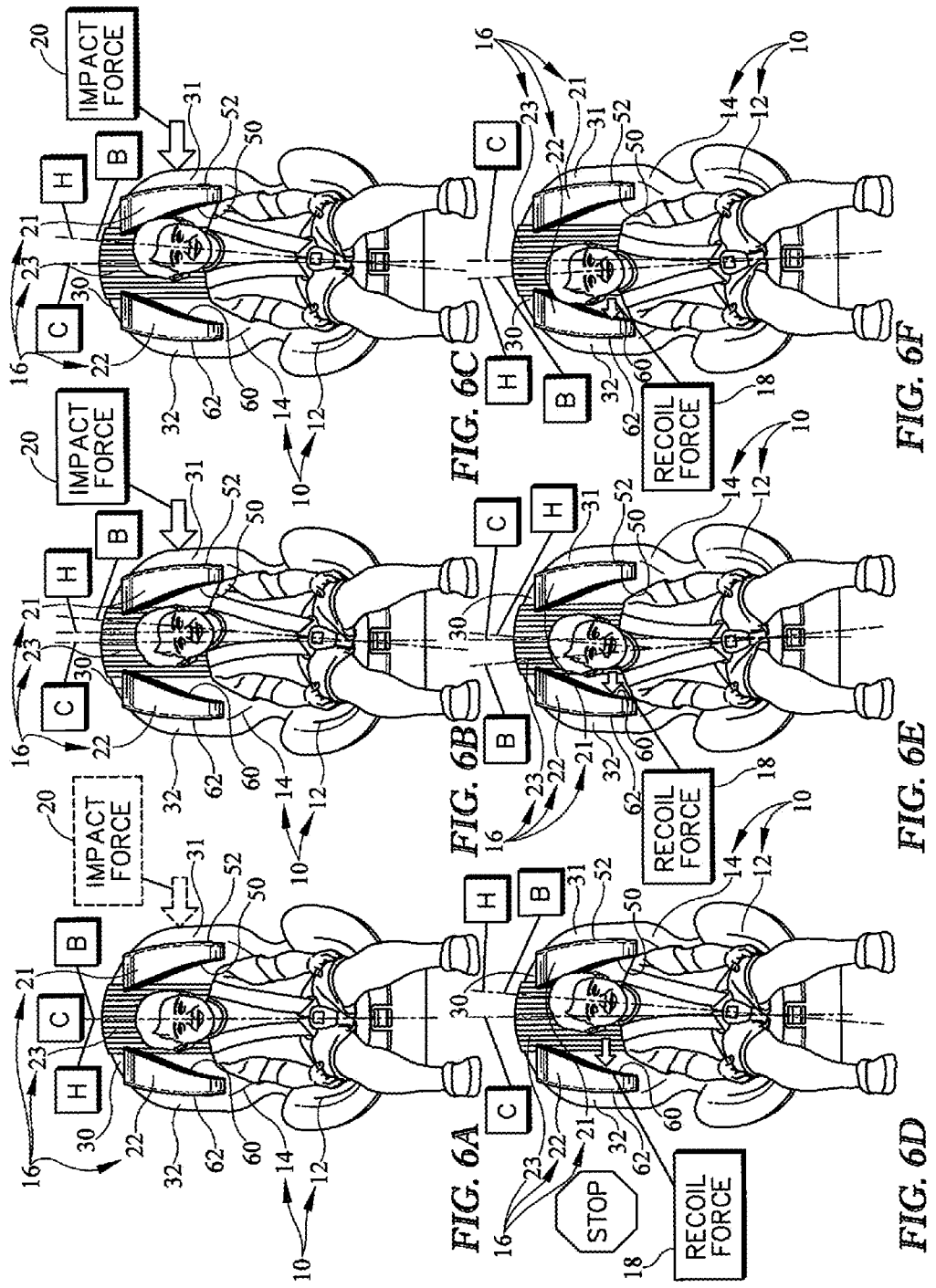
FIGS. 6A-6F are a series of views showing the energy-dissipation system of FIGS. 4 and 5 and its effect on a child seated in the child restraint when an impact force is applied to the child restraint.

As illustrated fully in FIGS. 6A-6F, inclusion of first and second force dissipaters 21 and 22 in energy-dissipation system 16 also minimizes the distance of travel for a child's head during a collision. Prior to a collision, a child's head and body are generally positioned to be aligned with center-line axis C, as seen in FIGS. 1 and 6A. Immediately following a collision, the juvenile vehicle seat 10 will be moved in the direction of the impact force 20 relative to the child, causing the child's upper body and head to move in the direction of first force dissipater 21. Energy-dissipation system 16 minimizes the distance of travel of a child's head from a first, resting position aligned with center-line axis C as seen in FIG. 6A, to a second, angled position when the child's head engages with first force dissipater 21 after the external impact force 20 has been applied as seen in FIG. 6C. In addition, if there is a substantial recoil force 18 from the child's head when it rebounds or deflects from engagement with first force dissipater 21, energy-dissipation system 16 minimizes the distance of travel for a child's head from the second, angled position as seen in FIG. 6C to a third, counter-angled position engaging with second force dissipater 22 as a result of recoil force 18 in a direction opposite of first force dissipater 21, as seen in FIG. 6F.

Energy-dissipation system 16 also minimizes the maximum difference between a child's head-line axis C and body-line axis B during a collision. As seen in FIGS. 2 and 3, energy-dissipation system 16 is configured to cause a child's body or shoulders to first impact first force dissipater 21 before a child's head impacts first force dissipater 21. In this way, first force dissipater 21 limits the angle or degree of movement of the child's body-line axis B away from center-line axis C and the child's head-line axis H. As the child's head continues to move toward first force dissipater 21, the angle between the child's head-line axis H and body-line axis B continues to shrink because the child's body-line axis B is held in place by first force dissipater 21, thereby reducing g-loads or other similar forces on the child's head, such as whiplash.

Figure 7:
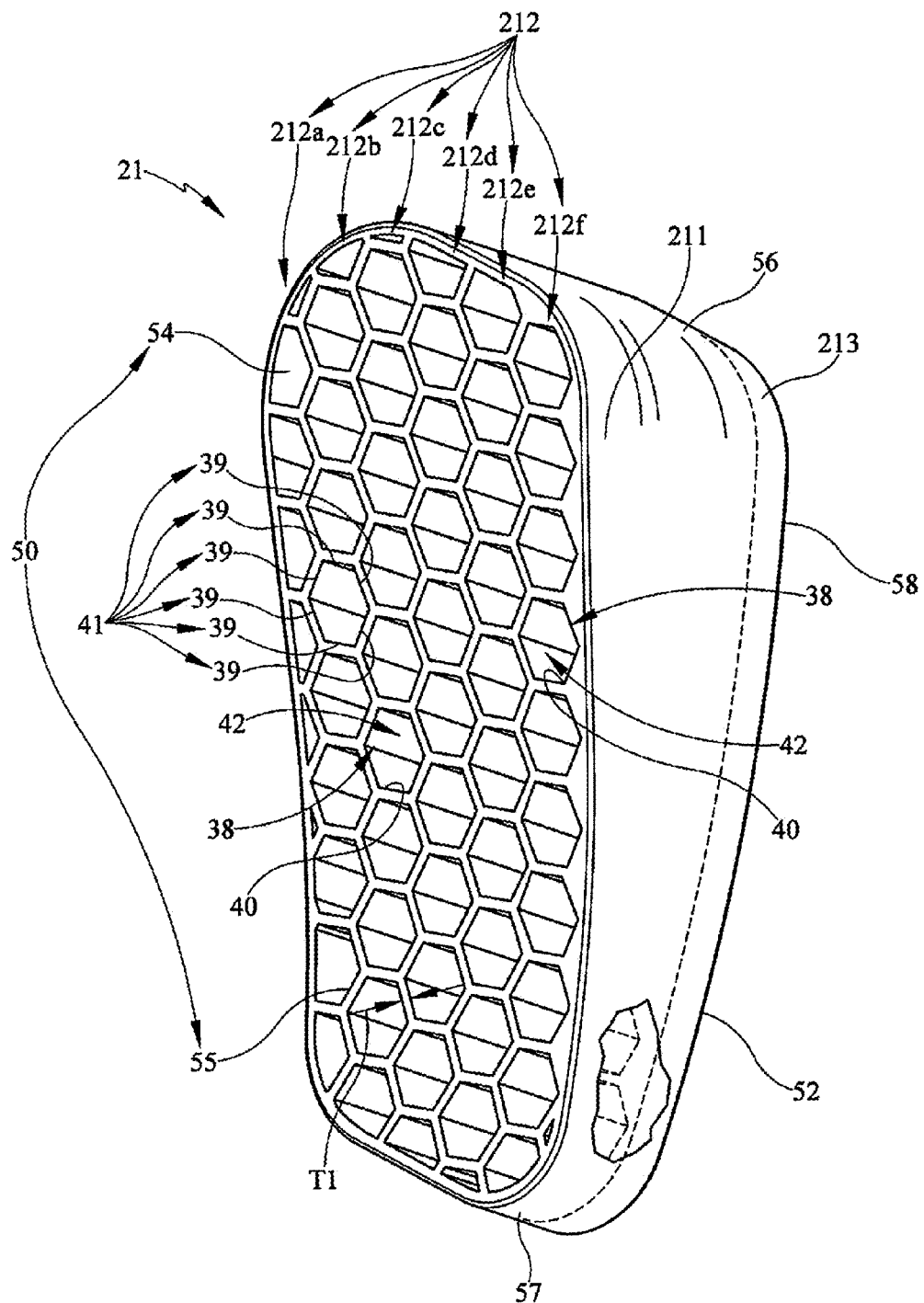
FIG. 7 is a perspective view of a portion of the energy-dissipation system of FIGS. 4 and 5 and showing that the energy-dissipation system includes a first pad foundation and a first ride-down pad, the first ride-down pad includes an array of outwardly projecting crush strips, the first pad foundation includes a substrate that provides means for supporting the array in spaced-apart relationship, the energy-dissipation system also includes a top and bottom surface, and the first ride-down pad is arranged to extend away from the first side-wing panel of the vehicle seat toward the second side-wing panel of the vehicle seat when this portion of the energy-dissipation system is coupled to the first side-wing panel of the vehicle seat to extend generally parallel to the top and bottom surfaces.
Figure 8:
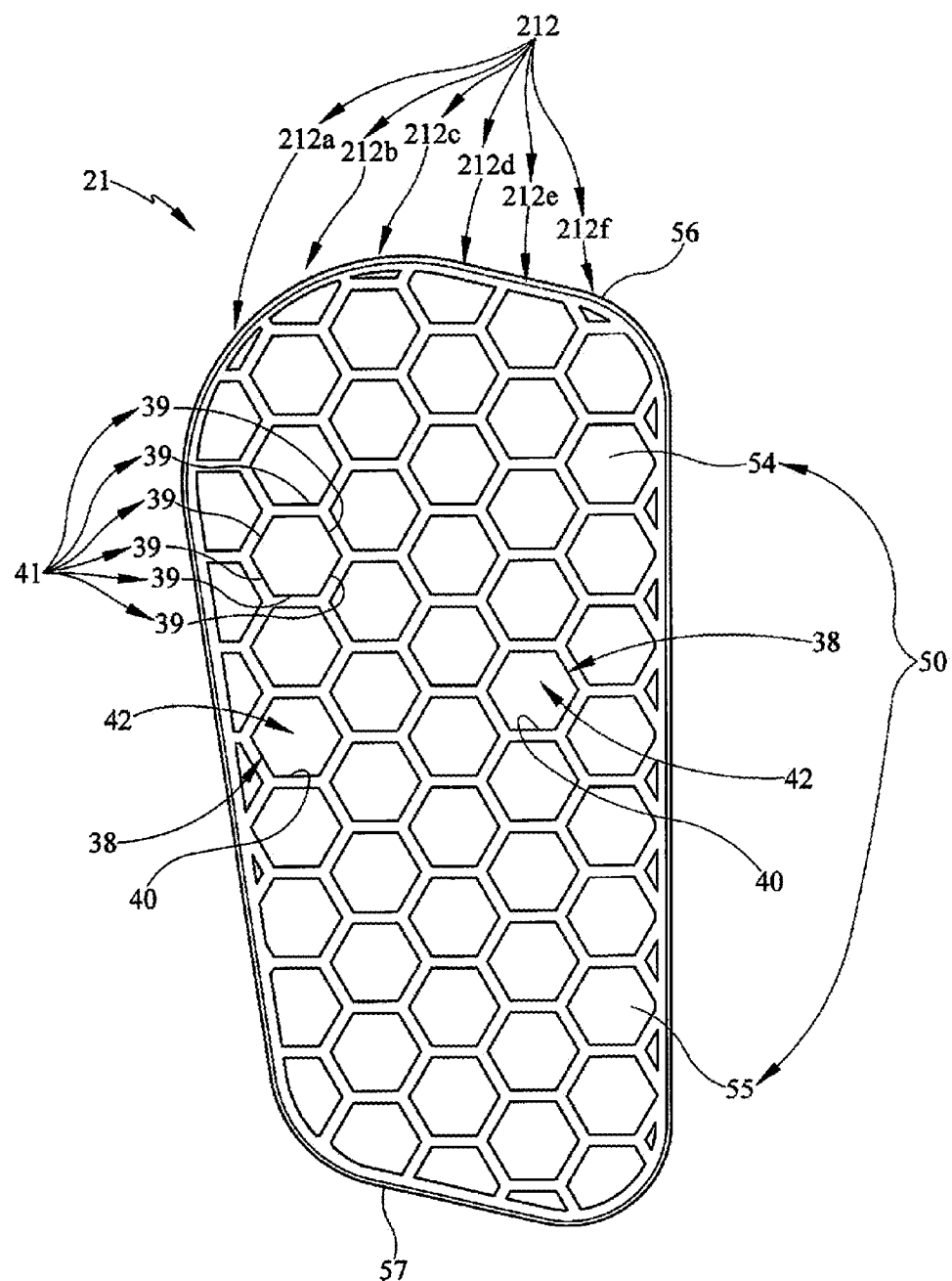
FIG. 8 is a front elevation view of the portion of the energy-dissipation system of FIG. 7 and showing the crush strips of the first ride-down pad being vertically oriented and formed by a series of hexagon-shaped structures or crush cells coupled to one another, the crush cells being formed to include a crush aperture or a hexagon-shaped crush aperture that opens into a crush space formed in the crush cells, the crush cells having six walls of having a generally uniform thickness.

As suggested in FIG. 7, first force dissipater 21 includes a first pad foundation 213 coupled to the seat backrest 24 and a first ride-down pad 211. First ride-down pad 211 includes an array of outwardly projecting crush strips 212. First ride-down pad 211 of outwardly projecting crush strips 212 is arranged to extend away from first side-wing panel 31 toward second side-wing panel 32. As shown in FIGS. 7 and 8, first ride-down pad 211 includes a series of vertically oriented crush strips 212a, 212b, 212c, 212d, 212e, and 212f coupled together. As an illustrative example, a series of hexagon-shaped structures or crush cells 38 are coupled to one another to establish crush strip 212a as shown in FIGS. 7 and 8. Another series of crush cells 38 are coupled together to establish another crush strip 212b as shown in FIGS. 7 and 8. Crush strips 212a, 212b are coupled together with other crush strips 212c, 212d, 212e, and 212f to establish first ride-down pad 211.

Each crush cell 38 includes six walls 39 each having about the same length. As shown in FIGS. 7 and 8, each crush cell 38 is formed to include a hexagon-shaped crush aperture 40 arranged to open into a crush space 42 formed in crush cells 38. Crush space 42 is defined between the six walls 39 of crush cell 38. The six walls 39 are coupled to one another to establish a crush-cell perimeter 41. Each wall 39 has an illustrative first thickness T1 as shown in FIG. 7. As mentioned above, the invention also extends to other polygonal or circular shaped crush cells.

First pad foundation 213 is coupled to first ride-down pad 211 as shown, for example, in FIGS. 7-10. First pad foundation 213 is configured to provide means for supporting first ride-down pad 211 of crush strips 212 in spaced-apart relation to headrest 26. First pad foundation 213 interconnects first ride-down pad 211 to headrest 26, and in particular, to first side-wing panel 31 as shown in FIG. 4. It is within the scope of the present disclosure for first pad foundation 213 to be coupled to first ride-down pad 211. It is also within the scope of the present disclosure for first ride-down pad 211 and pad foundation 213 to cooperate to form a monolithic, first force dissipater 21.

As an example, pad foundation 213 is a sheet of foam material. A sheet is defined to be a broad, relatively thin layer of material having a generally constant density throughout. However, it is within the scope of the present disclosure for pad foundation 213 to be a layer of material including various structures that define voids in the substrate. Furthermore, the wall thickness may be varied so as to increase or decrease a volume of the void. Also, the height of the crush cell 38 may be varied.

Figure 9:
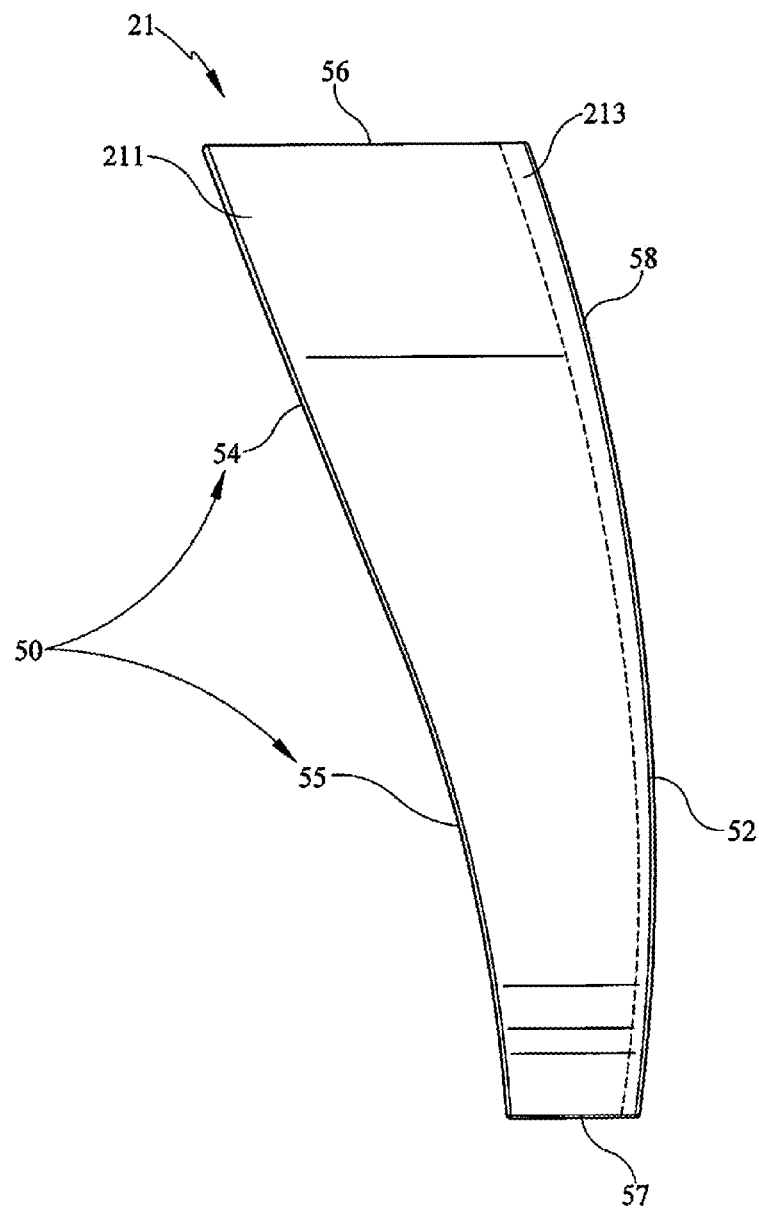
FIG. 9 is a left elevation view of the portion of the energy-dissipation system of FIG. 7, showing that the first ride-down pad includes a lower, concave surface and an upper, convex surface on a side of the ride-down pad that faces towards the child when this portion of the energy-dissipation system is coupled to the first side-wing panel of the vehicle seat.
Figure 10:
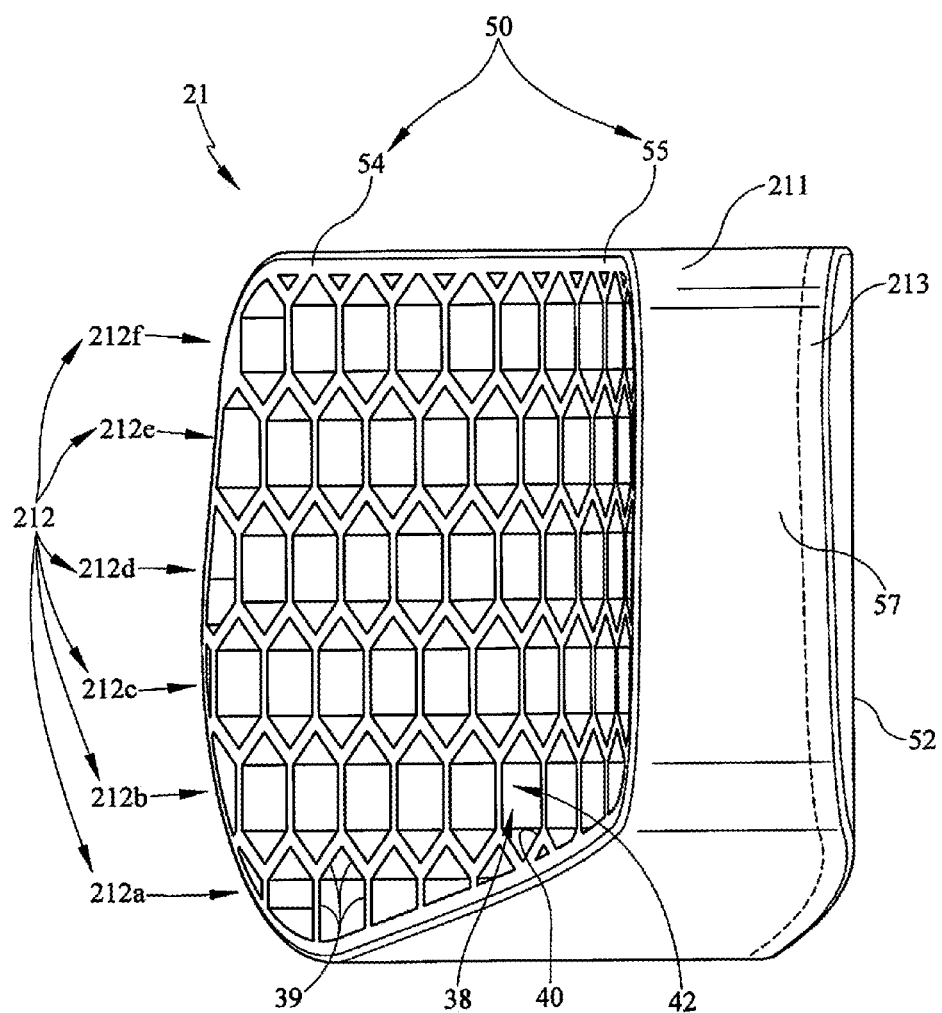
FIG. 10 is a bottom view of the portion of the energy-dissipation system of FIG. 7 showing the array of outwardly projecting crush strips and the increase in depth of this portion of the energy-dissipation system as it extends upward in a direction away from the bottom surface of this portion of the energy-dissipation system.

As seen in FIGS. 6A-6F and 9, first force dissipater 21 includes a front surface 50 and a back surface 52. Front surface 50 faces inward toward the child and back surface 52 faces outward toward first side-wing panel 31 when first force dissipater 21 is coupled to headrest 26 of juvenile vehicle seat 10. Front surface 50 includes an upper, convex surface 54 and a lower, concave surface 55 configured to engage with a child's head or upper body portion, respectively, during a collision, as illustrated in FIGS. 7 and 9. Convex surface 54 is positioned between concave surface 55 and a top surface 56 of first force dissipater 21, and concave surface 55 is positioned between convex surface 54 and a bottom surface 57 of first force dissipater 21. Back surface 52 includes a back convex surface 58, as illustrated in FIGS. 7 and 9.

As illustrated in FIGS. 6A-6F and 9, first force dissipater 21 is wider near convex surface 54 than it is near concave surface 55. Bottom surface 57 is smaller in width than top surface 56 as a result of the smaller width of the first force dissipater 21 near concave surface 55. In this manner, first force dissipater 21 is arranged to correspond to a child's upper body with concave surface 55 and a child's head with convex surface 54. The result of this arrangement is that a child's upper body portion will engage with concave surface 55 of first force dissipater 21 before a child's head will engage with convex surface 54 of first force dissipater 21 after an external impact force 20 has impacted the juvenile vehicle seat 10.

Figure 11:
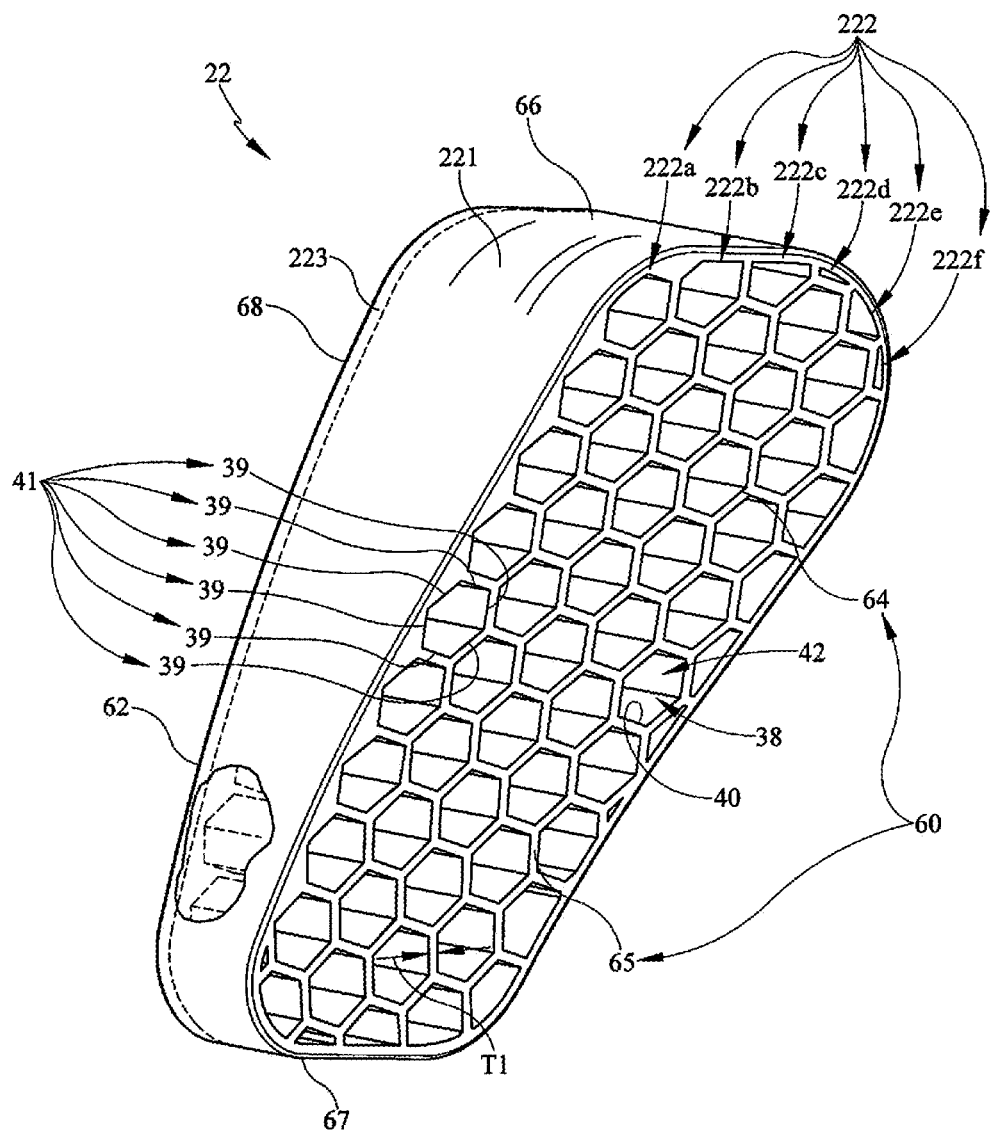
FIG. 11 is a perspective view of a portion of the energy-dissipation system of FIGS. 4 and 5 and showing that the energy-dissipation system includes a second pad foundation and a second ride-down pad, the second ride-down pad includes an array of outwardly projecting crush strips, the second pad foundation includes a substrate that provides a means for supporting the array in spaced-apart relationship, the energy-dissipation system also includes a top and bottom surface, and the second ride-down pad is arranged to extend away from the second side-wing panel of the vehicle seat toward the first side-wing panel of the vehicle seat when this portion of the energy-dissipation system is coupled to the second side-wing panel of the vehicle seat to extend generally parallel to the top and bottom surfaces.
Figure 12:
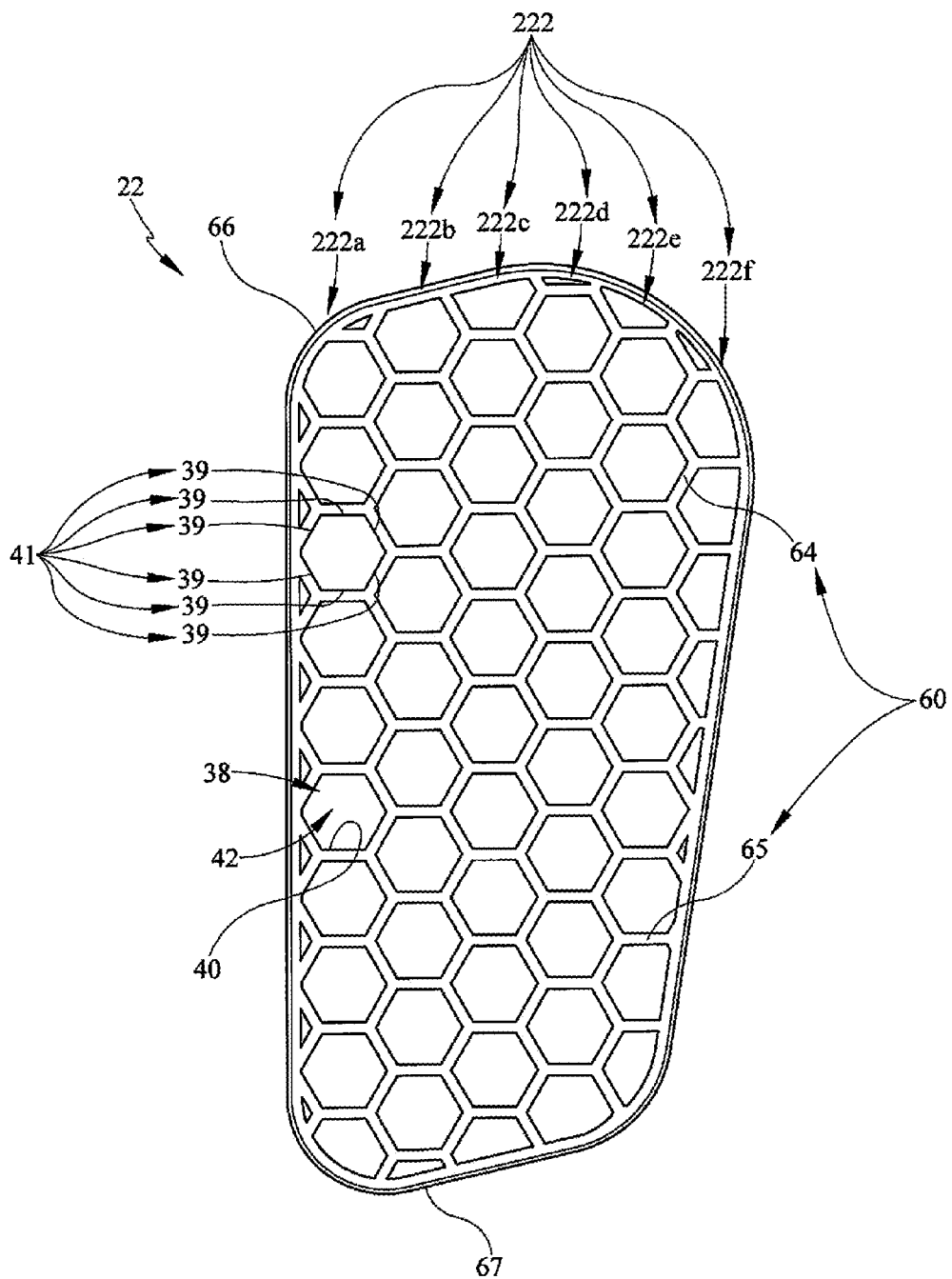
FIG. 12 is a front elevation view of the portion of the energy-dissipation system of FIG. 11 and showing the crush strips of the second ride-down pad being vertically oriented and formed by a series of hexagon-shaped structures or crush cells coupled to one another, the crush cells being formed to include a crush aperture or a hexagon-shaped crush aperture that opens into a crush space formed in the crush cells, the crush cells having six walls of having a generally uniform thickness.

As suggested in FIG. 11, second force dissipater 22 includes a second pad foundation 223 coupled to the seat backrest 24 and a second ride-down pad 221. Second ride-down pad 221 includes an array of outwardly projecting crush strips 222a, 222b, 222c, 222d, 222e, and 222f as shown in FIGS. 11-14. Second ride-down pad 221 of outwardly projecting crush strips 222 is arranged to extend away from second side-wing panel 32 toward first side-wing panel 31. As shown in FIGS. 11 and 12, second ride-down pad 221 includes a series of vertically oriented crush strips 222 coupled together. As an illustrative example, series of crush cells 38 are coupled to one another to establish crush strip 222a as shown in FIGS. 11 and 12. Another series of crush cells 38 are coupled together to one another establish another crush strip 222b as shown in FIGS. 11 and 12. Crush strips 222a, 222b are coupled together with other crush strips 222c, 222d, 222e, and 222f to establish second ride-down pad 221.

Second pad foundation 223 is coupled to second ride-down pad 221 as shown, for example, in FIGS. 11-14. Second pad foundation 223 is configured to provide means for supporting second ride-down pad 221 of crush strips 222 in spaced-apart relation to headrest 26. Second pad foundation 223 interconnects second ride-down pad 221 to headrest 26, and in particular, to second side-wing panel 32 as shown in FIG. 4. It is within the scope of the present disclosure for second pad foundation 223 to be coupled to second ride-down pad 221. It is also within the scope of the present disclosure for second ride-down pad 221 and second pad foundation 223 to cooperate to form a monolithic second force dissipater 22.

As an example, second pad foundation 223 is a sheet of foam material. A sheet is defined to be a broad, relatively thin layer of material having a generally constant density throughout. However, it is within the scope of the present disclosure for second pad foundation 223 to be a layer of material including various structures that define voids in the substrate. Furthermore, the wall thickness may be varied so as to increase or decrease a volume of the void. Also, the height of the crush cell 38 may be varied.

Each crush cell 38 includes six walls 39 each having about the same length. As shown in FIGS. 11 and 12, each crush cell 38 is formed to include hexagon-shaped crush aperture 40 arranged to open into crush space 42 formed in crush cell 38. The six walls 39 of the crush cell 38 define crush aperture 40. Crush space 42 is defined between the six walls 39. The six walls 39 are coupled to one another to establish crush-cell perimeter 41. Each wall has a first thickness T1 as shown in FIG. 11. It is within the scope of the present disclosure to vary the wall 39 thickness so as to increase or decrease a volume of the crush space 42. As mentioned above, the invention also extends to other polygonal or circular shaped crush cells.

Figure 13:
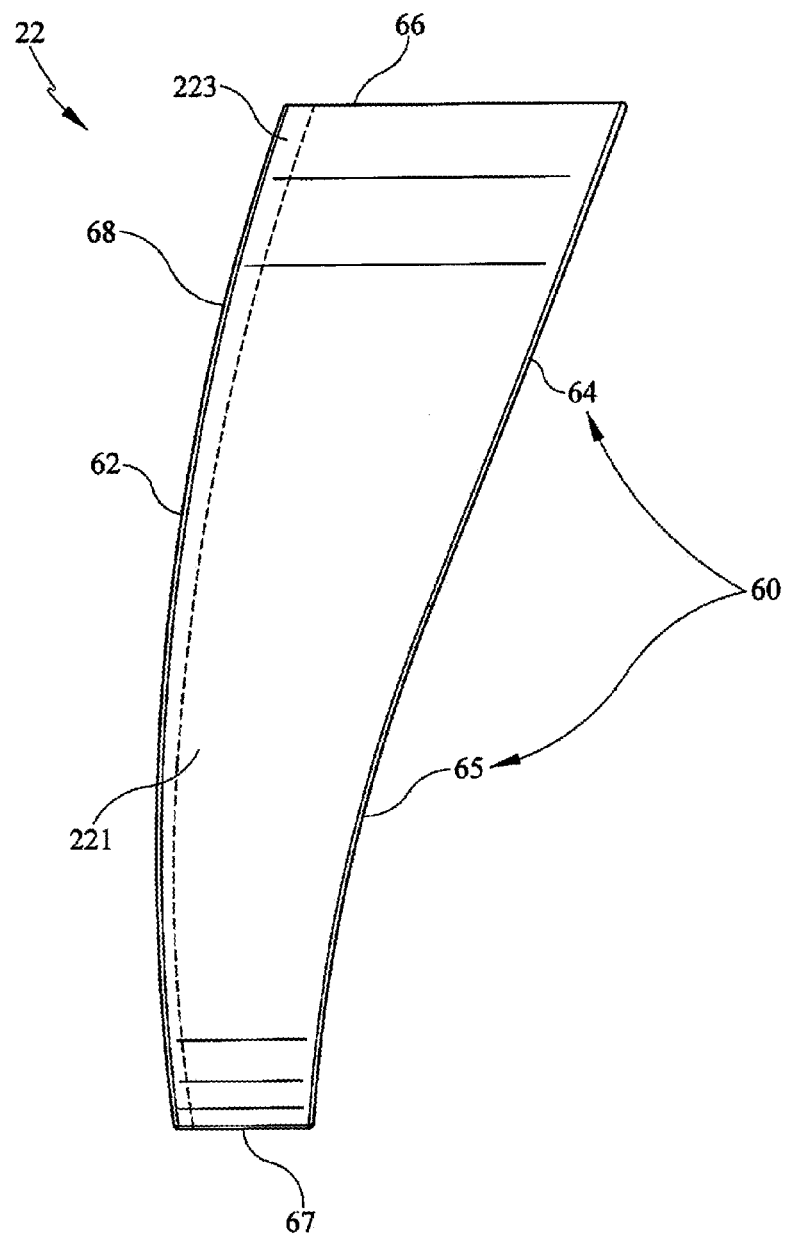
FIG. 13 is a left elevation view of the portion of the energy-dissipation system of FIG. 11, showing that the second ride-down pad includes a lower, concave surface and an upper, convex surface on a side of the second ride-down pad that faces towards the child when this portion of the energy-dissipation system is coupled to the second side-wing panel of the vehicle seat.
Figure 14:
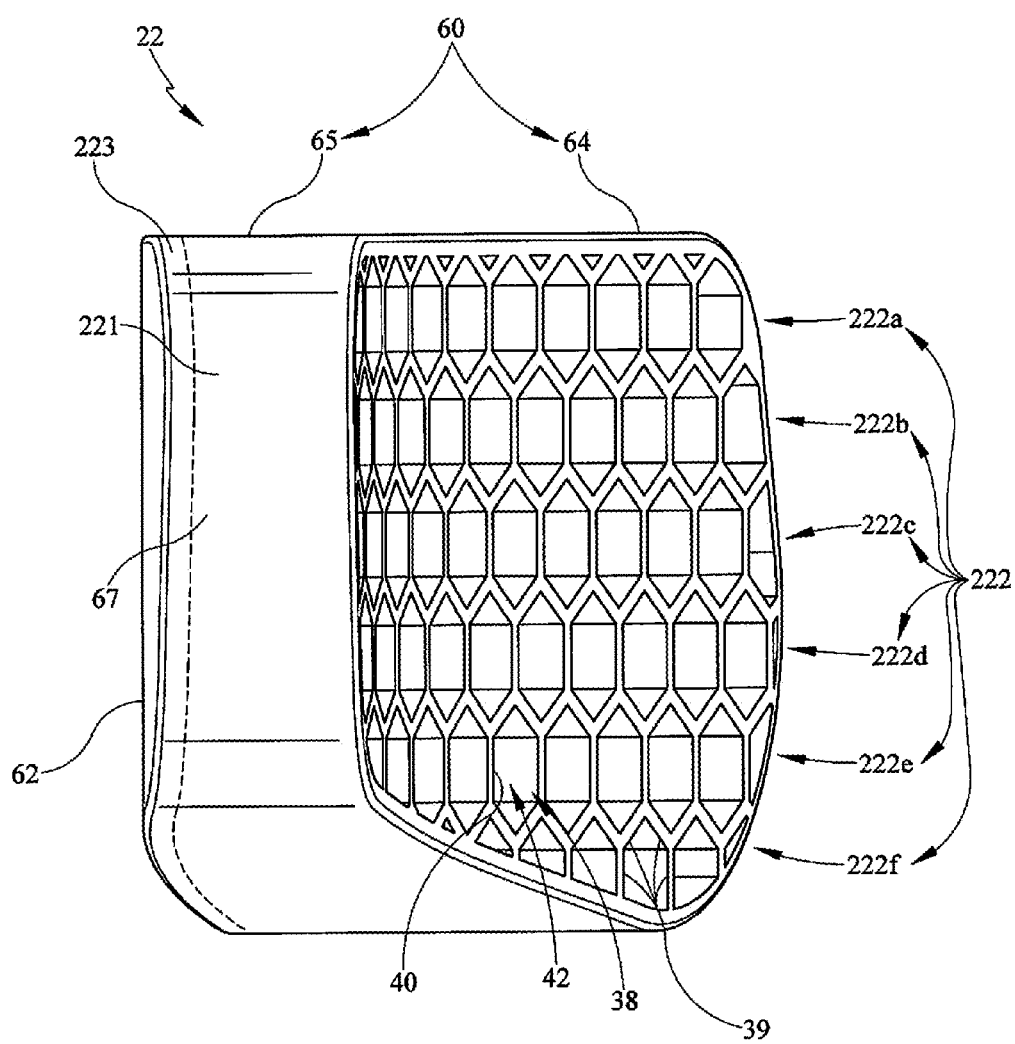
FIG. 14 is a bottom view of the portion of the energy-dissipation system of FIG. 11 showing the array of outwardly projecting crush strips and the increase in depth of this portion of the energy-dissipation system as it extends upward in a direction away from the bottom surface of this portion of the energy-dissipation system.

As seen in FIGS. 6A-6F and 13, second force dissipater 22 includes a front surface 60 and a back surface 62. Front surface 60 faces inward toward the child and back surface 62 faces outward toward second side-wing panel 32 when second force dissipater 22 is coupled to headrest 26 of juvenile vehicle seat 10. Front surface 60 includes an upper, convex surface 64 and a lower, concave surface 65 configured to engage with a child's head or upper body portion, respectively, during a collision, as illustrated in FIGS. 11 and 13. Convex surface 64 is positioned between concave surface 65 and a top surface 66 of second force dissipater 22, and concave surface 65 is positioned between convex surface 64 and a bottom surface 67 of second force dissipater 22. Back surface 62 includes a back convex surface 68, as illustrated in FIGS. 11 and 13.

As illustrated in FIGS. 6A-6F and 13, second force dissipater 22 is wider near convex surface 64 than it is near concave surface 65. Bottom surface 67 is smaller in width than top surface 66 as a result of the smaller width of the second force dissipater 22 near concave surface 65. In this manner, second force dissipater 22 is arranged to correspond to a child's upper body with concave surface 65 and a child's head with convex surface 64. The result of this arrangement is that a child's upper body portion will engage with concave surface 65 of second force dissipater 22 before a child's head will engage with convex surface 64 of second force dissipater 22 after an external impact force 20 has impacted the juvenile vehicle seat 10.

Figure 15:
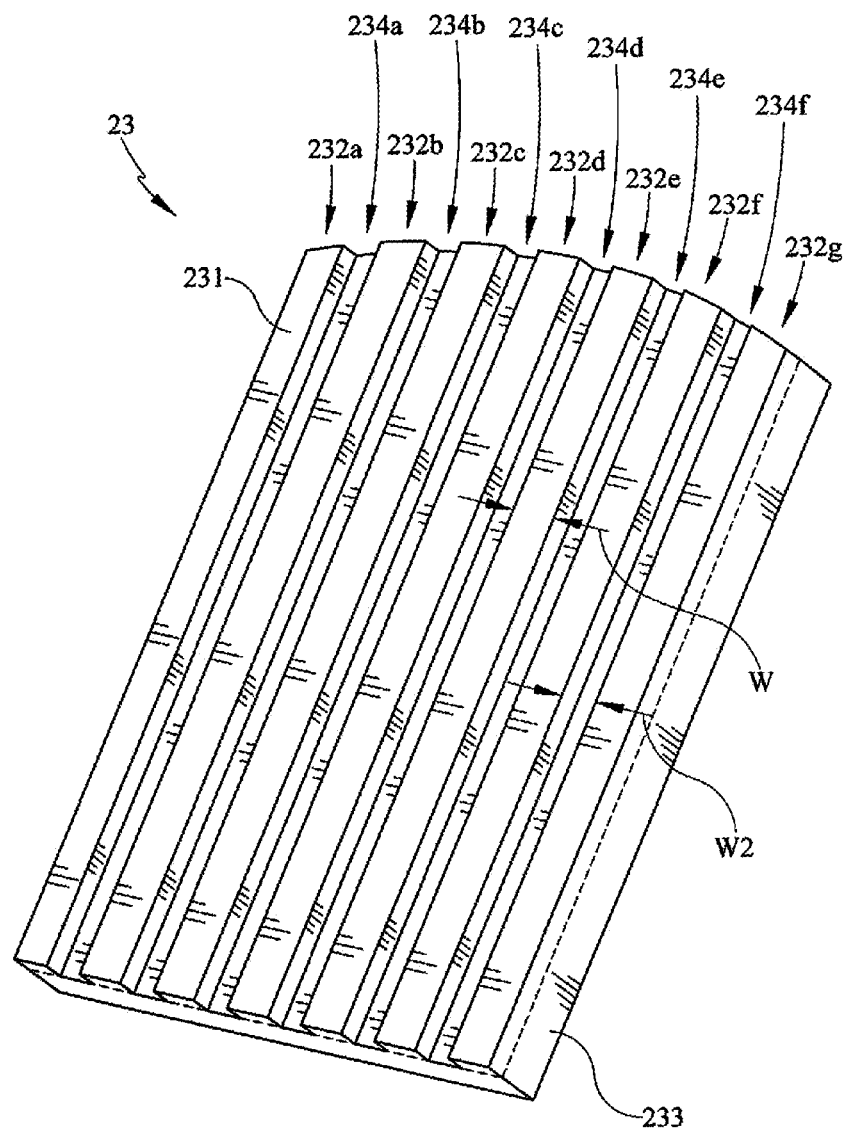
FIG. 15 is a perspective view of the third pad foundation and third ride-down pad included in the energy-dissipation system of FIGS. 4 and 5, the third ride-down pad including an array of outwardly projecting crush strips arranged to extend away from the third pad foundation when the third pad foundation is coupled to a rear panel of the headrest of the child restraint and showing the crush strips lie is spaced apart relationship to each other and define channels therebetween.
Figure 16:
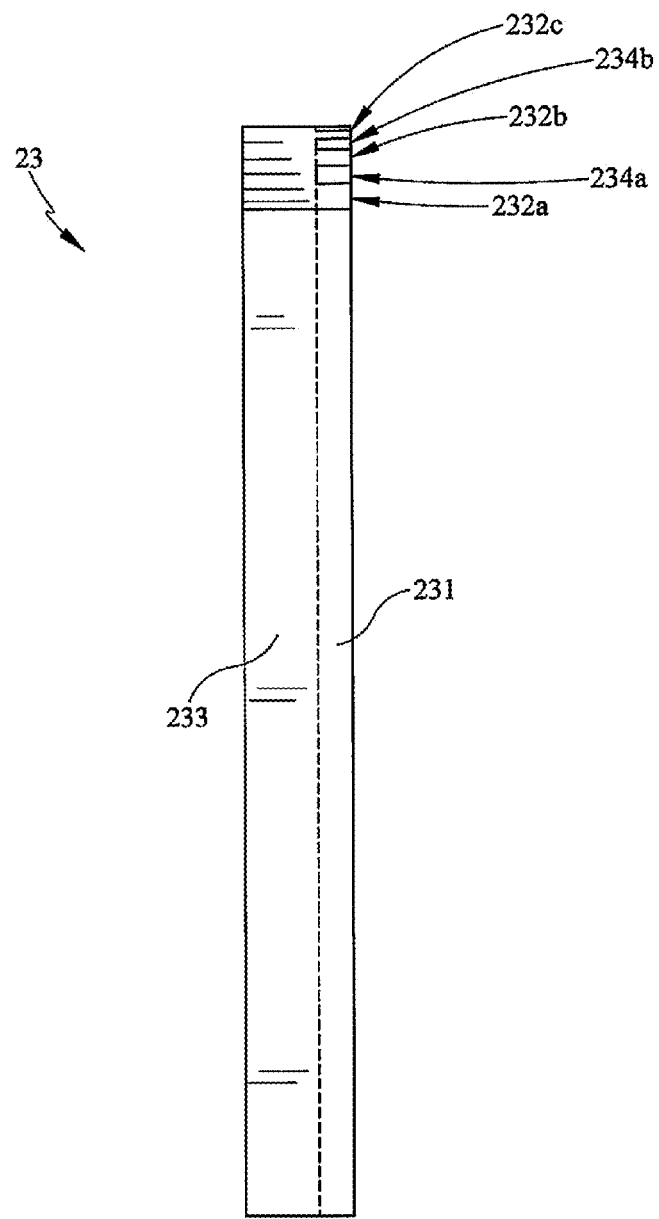
FIG. 16 is a left elevation view of the third pad foundation and third ride-down pad of FIG. 15 showing that the third pad foundation is coupled to the array of outwardly projecting crush strips of the third-ride down pad and configured to provide means for interconnecting the crush strips in spaced-apart relation to each other.
Figure 17:
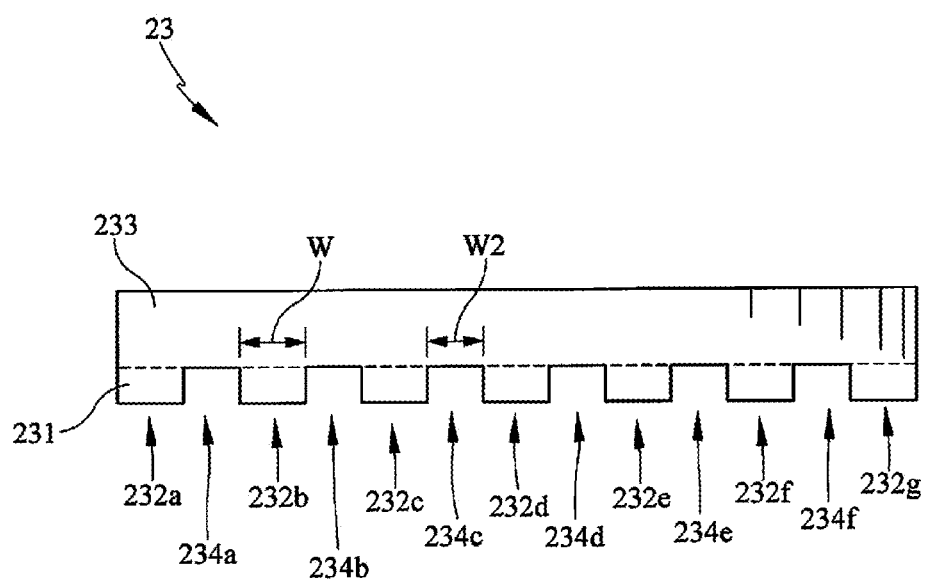
FIG. 17 is a top plan view of the third pad foundation and third ride-down pad of FIG. 15, showing that the crush strips are spaced apart from one another to define a companion slot therebetween, the crush strips and the companion slots extending the full length of the third ride-down pad.

As suggested in FIG. 15, third force dissipater 23 includes a third pad foundation 233 coupled to the seat backrest 24 and a third ride-down pad 231. Third ride-down pad 231 includes an array of outwardly projecting crush strips 232a, 232b, 232c, 232d, 232e, 232f, and 232g as shown in FIGS. 15-17. Third ride-down pad 231 of outwardly projecting crush strips 232a, 232b, 232c, 232d, 232e, 232f, and 232g is arranged to extend away from rear panel 30 of headrest 26 into space 28 defined between first and second force dissipaters 21, 22 as shown in FIG. 4. As an illustrative example, a first crush strip 232a is an extended portion that is positioned to lie in spaced-apart relation to a second crush strip 232b to define a slot or channel portion 234a therebetween. Each pair of adjacent crush strips 232 is spaced apart from one another to define a companion channel portion 234a therebetween as shown in FIGS. 15 and 17.

As shown in FIG. 15, each extended portion of crush strips 232 has a rectangular shape and has a first width W. Each channel portion 234 defined between each adjacent pair of crush strips 232 has a second width W2. It is within the scope of the present disclosure for first width W to be about equal to second width W2. It is also within the scope of the present disclosure for first width W to be less than second width W2 or greater than second width W2.

Third pad foundation 233 is coupled to third ride-down pad 231 as shown, for example, in FIGS. 15-17. Third pad foundation 233 is configured to provide means for supporting third ride-down pad 231 of crush strips 232 in spaced-apart relation to headrest 26. Third pad foundation 233 interconnects third ride-down pad 231 to headrest 26, and in particular, to rear panel 30 as shown in FIG. 4. It is within the scope of the present disclosure for third pad foundation 233 to be coupled to third ride-down pad 231. It is also within the scope of the present disclosure for third ride-down pad 231 and third pad foundation 233 to cooperate to form a monolithic third force dissipater 23.

As an example, third pad foundation 233 is a substrate or sheet of foam material. A sheet is defined to be a broad, relatively thin layer of material having a generally constant density throughout. However, it is within the scope of the present disclosure for third pad foundation 233 to be a layer of material including various structures that define voids in the third-pad foundation 233. Furthermore, the wall thickness may be varied so as to increase or decrease a volume of the void.

Any suitable means may be used to retain first, second, and third force dissipaters 21, 22, 23 in the mounted positions shown in FIGS. 1-4 and 6A-6F. As an example, force dissipaters may be coupled to panels 30, 31, 32 using fasteners such as hook-and-loop fasteners, glue, or any other suitable alternatives. In an illustrative embodiment, a fastener retains first force dissipater 21 in a fixed position relative to first side-wing panel 31.

Each of first, second, and third force dissipaters 21, 22, 23 is configured to deform at about a predetermined rate when exposed to a predetermined external impact force 20. It is within the scope of this disclosure to make first, second, and third force dissipaters 21, 22, 23 out of crushable designed material, foams (e.g., extruded polymer products, extra cellular polymer substances, Polyurethane (PU), Thermoplastic Elastomer (TPE), Polypropylene (PP), Expanded Polypropylene (EPP), Expanded Polystyrene (EPS) etc.), polystyrene (PS), Ethylene vinyl acetate (EVA), or combinations of the foregoing materials.

Force dissipaters may be arranged to extend beyond a rim 34 of headrest 26 as shown, for example, in FIG. 4. Headrest 26 includes rim 34 that extends along first side-wing panel 31, rear panel 30, and second side-wing panel 32 and faces upwardly away from seat back 14. As shown in FIG. 4, second force dissipater 22 includes a front perimeter surface 36 that extends outwardly beyond rim 34 and faces away from headrest 26. As an illustrative example, second force dissipater 22 extends beyond rim 34 a distance D1 which is defined to be between rim 34 and front perimeter surface 36 as shown in FIG. 4. It is also within the scope of the present disclosure for front perimeter surface 36 to lie below rim 34. It is also within the scope of the present disclosure for the front perimeter surface to be configured to match the shape of rim 34 so that the front perimeter surface does not lie below or extend beyond rim 34.

A second illustrative child restraint 111 includes juvenile vehicle seat 110, a seat base 113, and energy-dissipation system 116 as shown in FIGS. 18 and 19. Juvenile vehicle seat 110 is coupled to seat base 113 which is couple to a vehicle seat 44 as suggested in FIG. 18. Energy-dissipation system 116 comprises a force dissipater that is designed to minimize the g-loads experienced by a child seated on a seat bottom 112 of juvenile vehicle seat 110 during exposure of juvenile vehicle seat 110 to an external impact force. As an illustrative example, energy-dissipation system 116 includes first and second force dissipaters 21, 22 as shown in FIGS. 18 and 19.

As shown in FIG. 18, energy-dissipation system 116 is coupled to seat back 114 of juvenile vehicle seat 110, and, in particular, to a headrest 126 included in seat back 114. In illustrative embodiments, energy-dissipation system 116 is mounted on an inside portion of juvenile vehicle seat 110 as suggested, for example, in FIGS. 18 and 19. It is within the scope of the present disclosure to couple one or more of the force dissipaters included in energy-dissipation system 116 on other portions of juvenile vehicle seat 110 or other juvenile seat or device to facilitate absorption of energy caused by external impact forces applied to such seats or devices. It is also within the scope of the present disclosure to vary the number of force dissipaters coupled to the juvenile vehicle seat.

In the illustrated embodiment, seat back 114 of juvenile vehicle seat 110 includes a backrest 124 arranged to extend upwardly from seat bottom 112 and headrest 126 coupled to backrest 124. First force dissipater 21 is coupled to an inner wall of a first side-wing panel 131 included in headrest 126. Second force dissipater 22 is coupled to an inner wall of a second side-wing panel 132 included in headrest 126.

During a collision or other incident, application of an external impact force 20 to juvenile vehicle seat 110 causes juvenile vehicle seat 110 to move in the direction of impact force 20 (not shown) relative to an occupant. Such movement causes occupant to move toward and engage with or impact first force dissipater 21. This impact causes energy to be transferred from the impacting object (such as the occupant's shoulders and head) to first force dissipater 21 as suggested in FIG. 18.

First force dissipater 21 absorbs that transferred energy to minimize the magnitude of a resulting force applied to a child seated in juvenile vehicle seat 110 during the collision. First force dissipater 21 functions to minimize the g-loads (acceleration) experienced by the child seated on seat bottom 112 of juvenile vehicle seat 110 during exposure of seat 110 to external impact force 20 as suggested in FIG. 18. First force dissipater 21 also functions to maximize the time interval (i.e., ride-down time) between the moment the impacting object strikes first force dissipater 21 to apply the external impact force and the moment that resulting force reaches zero.

First force dissipater 21 and second force dissipater 22 of juvenile vehicle seat 110 are substantially similar in size, shape, and pattern to the first and second force dissipaters 21 and 22 as described for juvenile vehicle seat 10.

A further embodiment of a child restraint 311 is shown in FIGS. 20-26. Child restraint 311 comprises a juvenile vehicle seat 310 and an energy-dissipation system 340 that is coupled to the juvenile vehicle seat 310.

Figure 20:
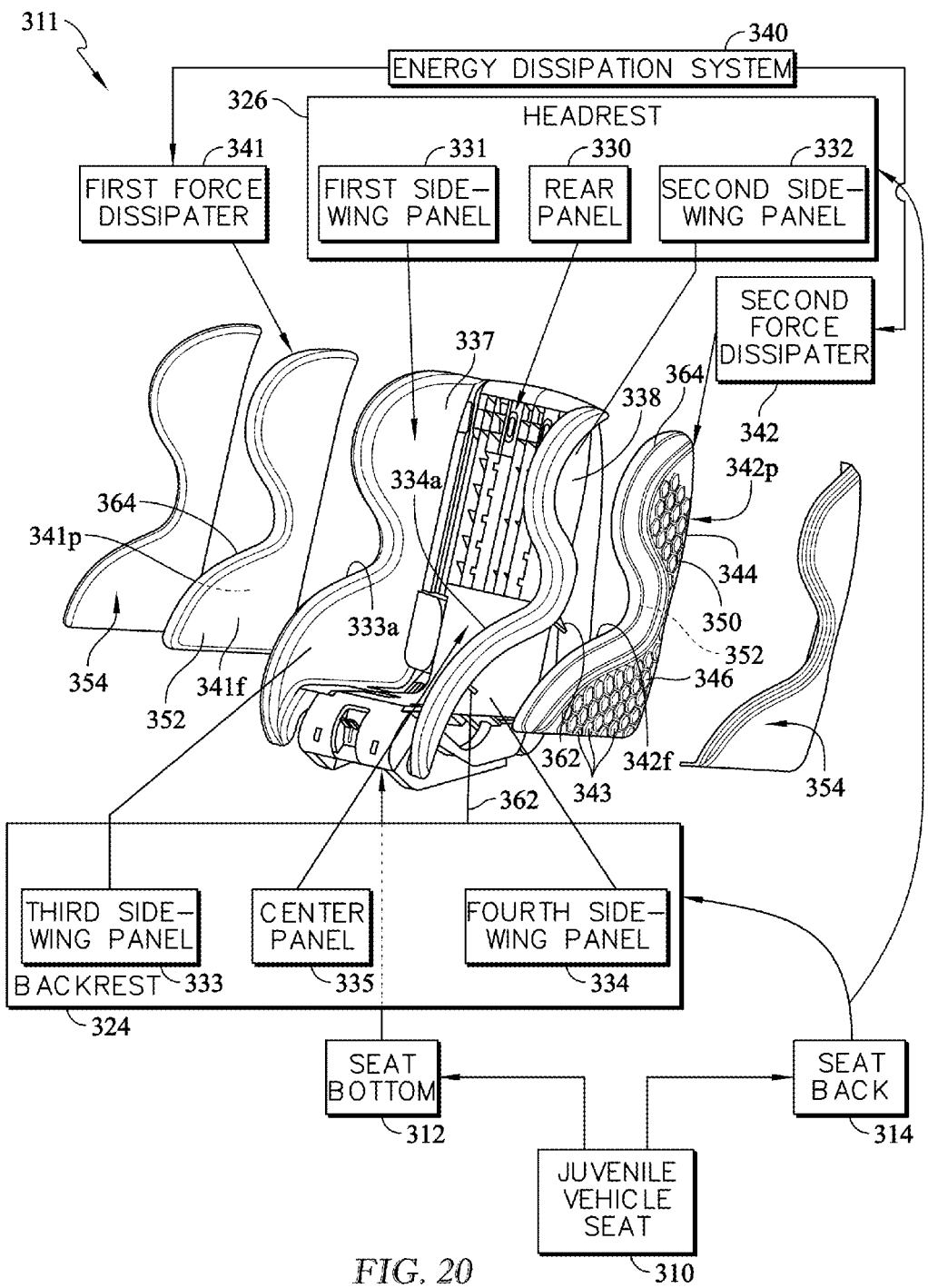
FIG. 20 is an exploded perspective assembly view of a third embodiment of a child restraint including a juvenile vehicle seat.
Figure 21:
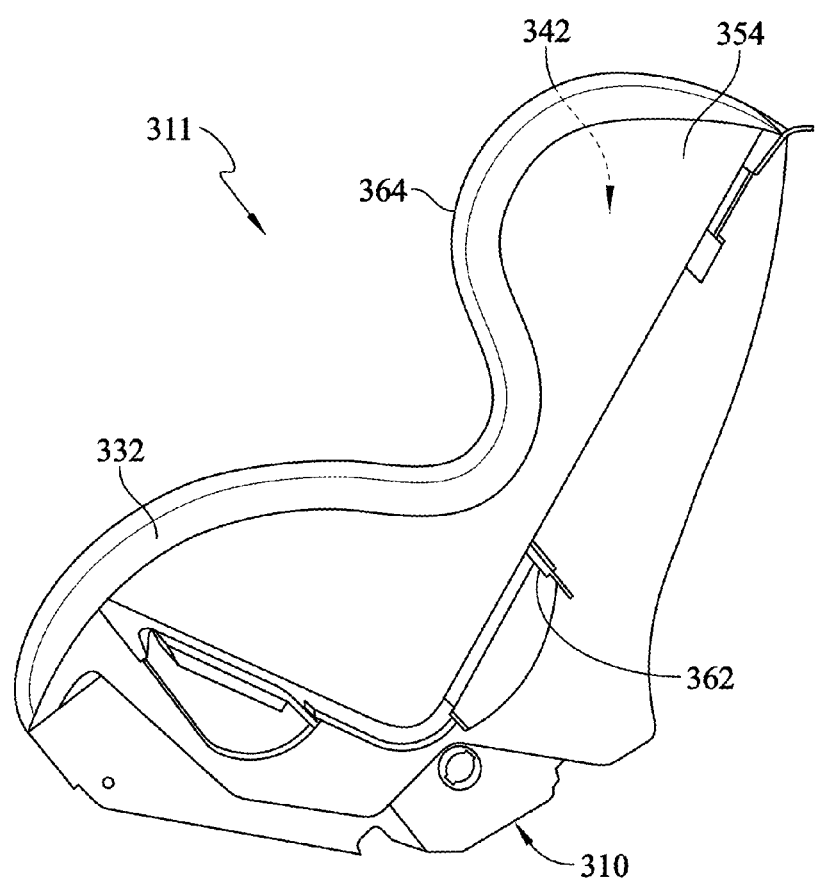
FIG. 21 is a side view of the child restraint including a juvenile vehicle seat of FIG. 20 in an assembled configuration.

Juvenile vehicle seat 310 includes a seat bottom 312 and a seat back 314 arranged to extend upwardly away from seat bottom 312 as suggested in FIG. 20. Seat back 314 also includes a backrest 324 coupled to seat bottom 312 and a headrest 326 coupled to an upper portion of backrest 324 as also suggested in FIG. 20.

Headrest 326 includes a rear panel 330 coupled to the upper portion of backrest 324, a first side-wing panel 331 coupled to a first side of rear panel 330, and a second side wing panel 332 coupled to an opposite second side of rear panel 330 to locate rear panel 330 between first and second side-wing panels 331, 332 as suggested in FIG. 20. Each of panels 330, 331, and 332 has an inwardly facing interior surface 337 and those interior surfaces 337 cooperate to define a head-receiving space receiving the head of an occupant seated on seat bottom 312 as suggested in FIGS. 20 and 23. Each of panels 330, 331, and 332 also has an outwardly facing exterior surface 338 as suggested in FIGS. 20 and 23.

Energy-dissipation system 340 is coupled to at least a part of the exterior surface 338 of the first and second side-wing panels 331, 332. Energy-dissipation system includes a first force dissipater 341 coupled to an exterior surface 338 of first side-wing panel 331 and a second force dissipater 342 coupled to an exterior surface 338 of second-side wing panel 332. First and second force dissipaters 341, 342 are configured to be mirror images of each other in illustrative embodiments.

In an illustrative embodiment, first force dissipater 341 includes a first ride-down pad 341P and a first pad foundation 341F as suggested in FIG. 20. First pad foundation 341F is coupled to exterior surface 338 of first side-wing panel 331 of headrest 326 of first side-wing panel 331 of headrest 326 of seat back 314 and first ride-down pad 341P is mounted on first pad foundation 341F. Second force dissipater 342 includes a second ride-down pad 342P and a second pad foundation 342F as suggested in FIG. 20. Second pad foundation 342F is coupled to exterior surface 338 of second side-wing panel 332 of headrest 326 of seat back 314 and second ride-down pad 342P is mounted on second pad foundation 342F.

First and second force dissipaters 341, 342 are illustratively of the form described above in relation to the first embodiment of the energy-dissipation system 16. Each of the first ride-down pad 341P of first force dissipater 341 and the second ride-down pad 342P of second force dissipater 342 comprises an array of crush strips 343. The array of crush strips 343 is formed by coupling adjacent crush strips to one another. In the embodiment illustrated the array of crush strips is integrally formed. Each crush strip 343 of the first and second force-dissipaters 341, 342 includes a series of polygonal or other-shaped structures 344 coupled to one another to establish a crush strip 343. In the embodiment illustrated the polygonal structures 344 are shown as hexagonal although any other suitable shape may also be employed. It is also envisaged that one or more different shaped structures may be employed to form the ride-down pads included in force dissipaters 21, 22, 341, 342.

As described above in relation to the first embodiment, each crush strip 343 of this further embodiment includes a series of crush cells 344 coupled to one another. Each crush cell 344 is formed to include a crush aperture 346 opening into a crush space formed in the crush cell 344.

Each of the ride-down pads 341P, 342P of first and second force dissipaters 341, 342 is configured to deform at about a predetermined rate when exposed to a predetermined external impact force. The ride-down pads 341P, 342P of first and second force dissipaters 341, 342 are made from a crushable designed material, foams (e.g., extruded polymer products, extra cellular polymer substances, Polyurethane (PU), Thermoplastic Elastomer (TPE), Polypropylene (PP), Expanded Polypropylene (EPP), Expanded Polystyrene (EPS) etc.), polystyrene (PS), Ethylene vinyl acetate (EVA), or combinations of the foregoing materials.

Backrest 324 of seat back 314 also includes a third side-wing panel 333 located below and adjacent to the first side-wing panel 331 and adjacent to a first side of the seat bottom 312 as suggested in FIG. 20. An upper portion of the third side-wing panel 333 is coupled to a lower portion of the first side-wing panel 331. A portion of third side-wing panel 333 is formed to include a first armrest 333A as suggested in FIG. 20. A lower portion of the third side-wing panel 333 is coupled to the first side of the seat bottom 312. In one illustrative embodiment, energy-dissipation system 340 is also coupled to exterior portions 338 of the third side-wing panel 333.

Figure 22:
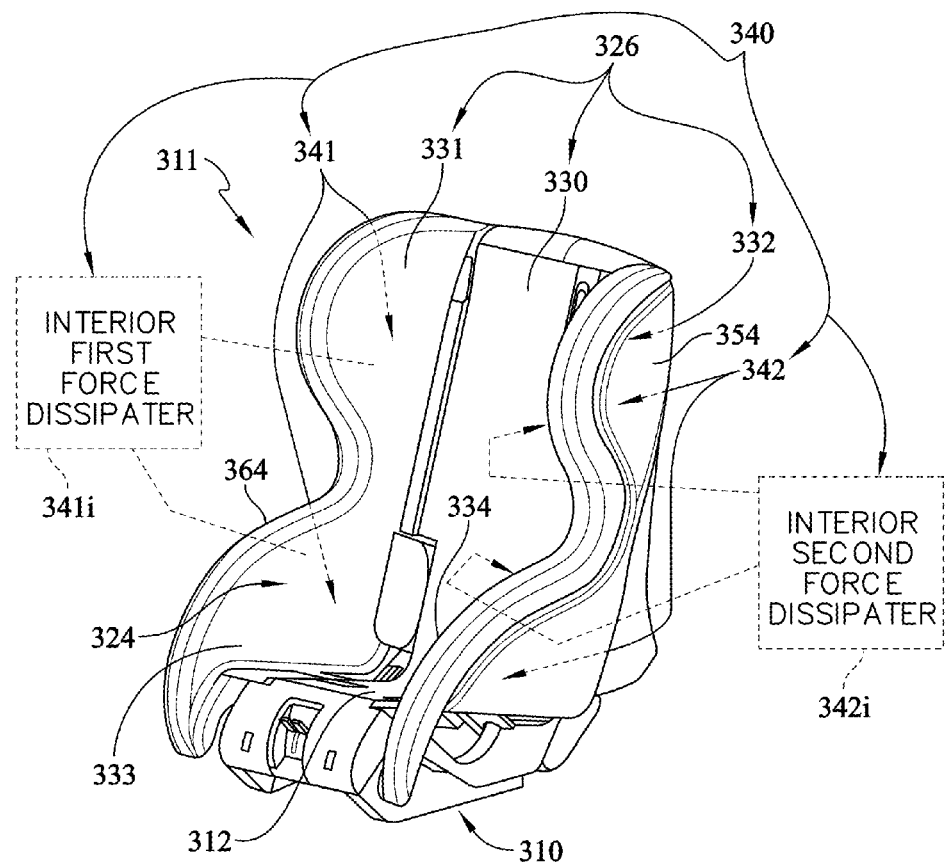
FIG. 22 is a front perspective view of the child restraint including a juvenile vehicle seat as shown in FIG. 21.
Figure 23:
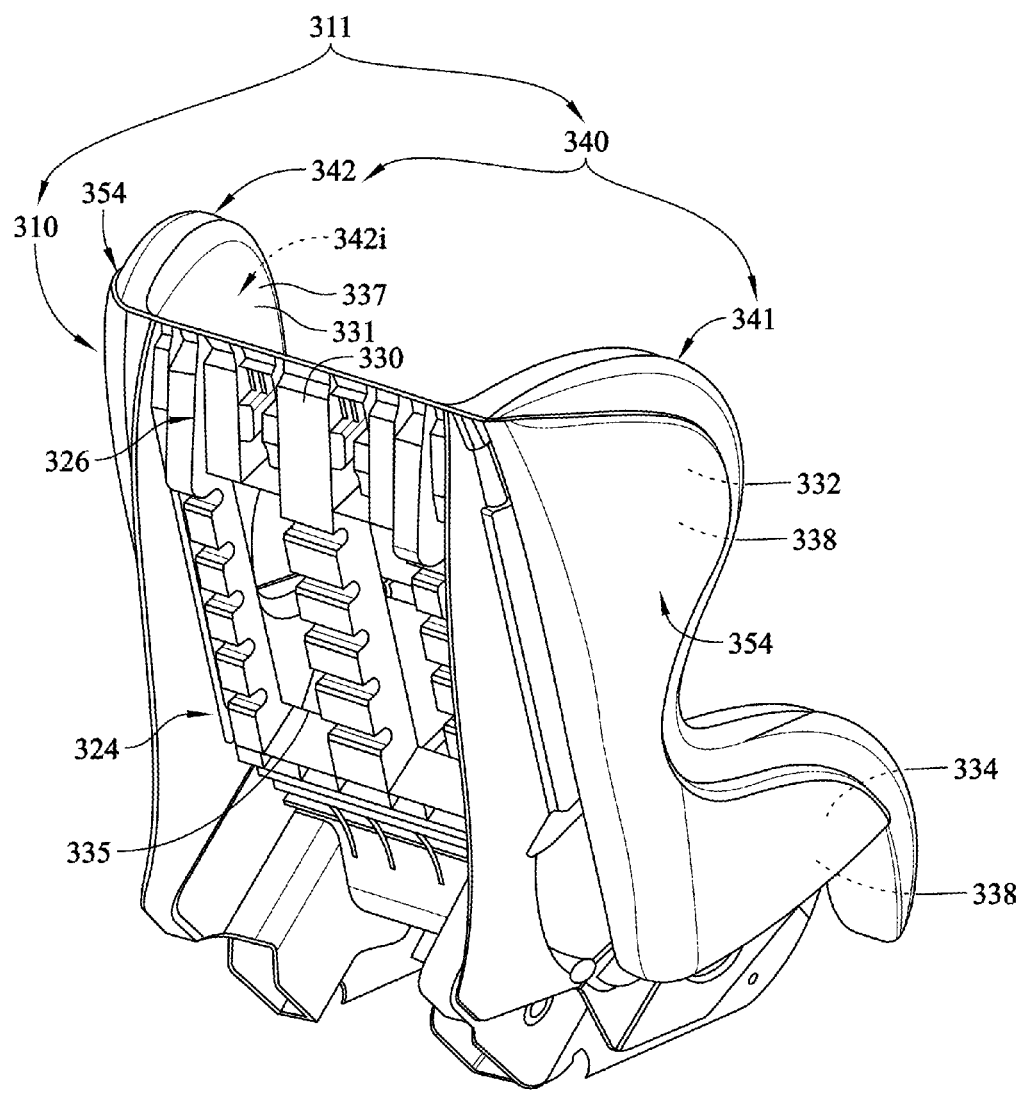
FIG. 23 is a rear perspective view of the child restraint including a juvenile vehicle seat as shown in FIG. 21.
Figure 24:
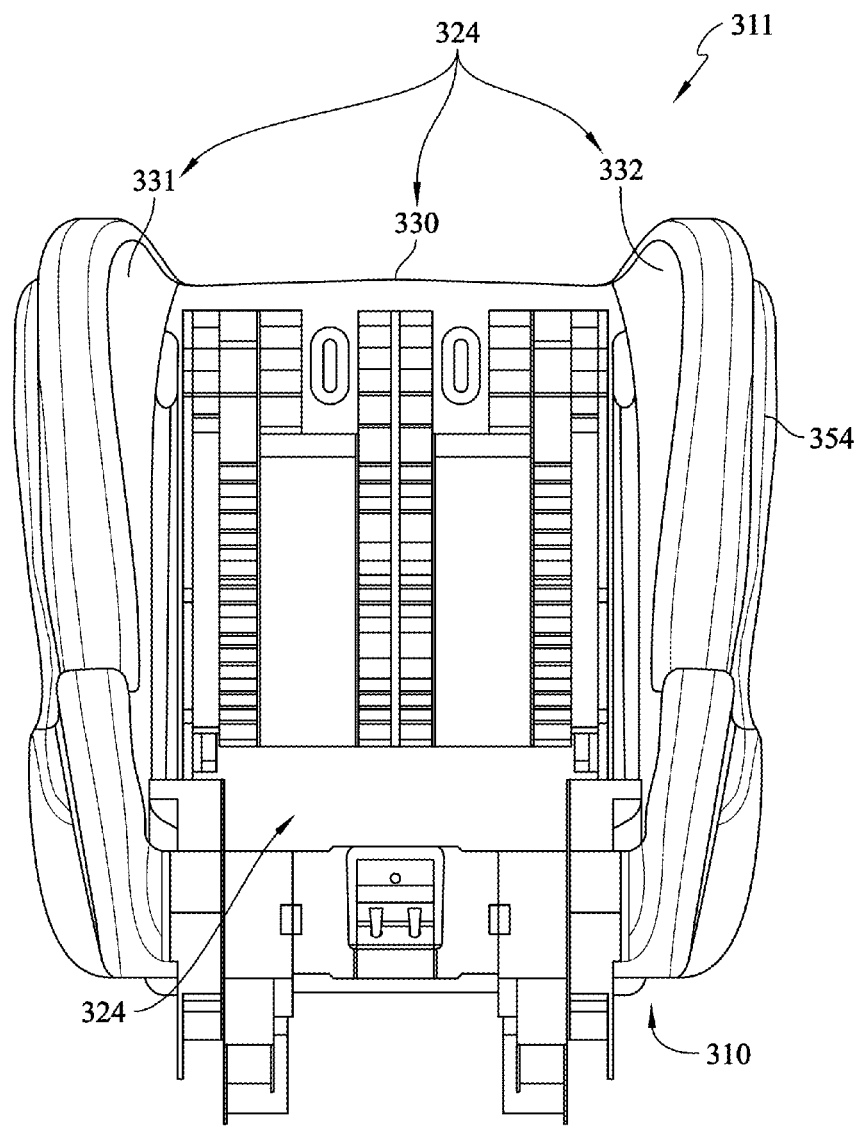
FIG. 24 is a front view of the child restraint including a juvenile vehicle seat as shown in FIG. 21.
Figure 25:
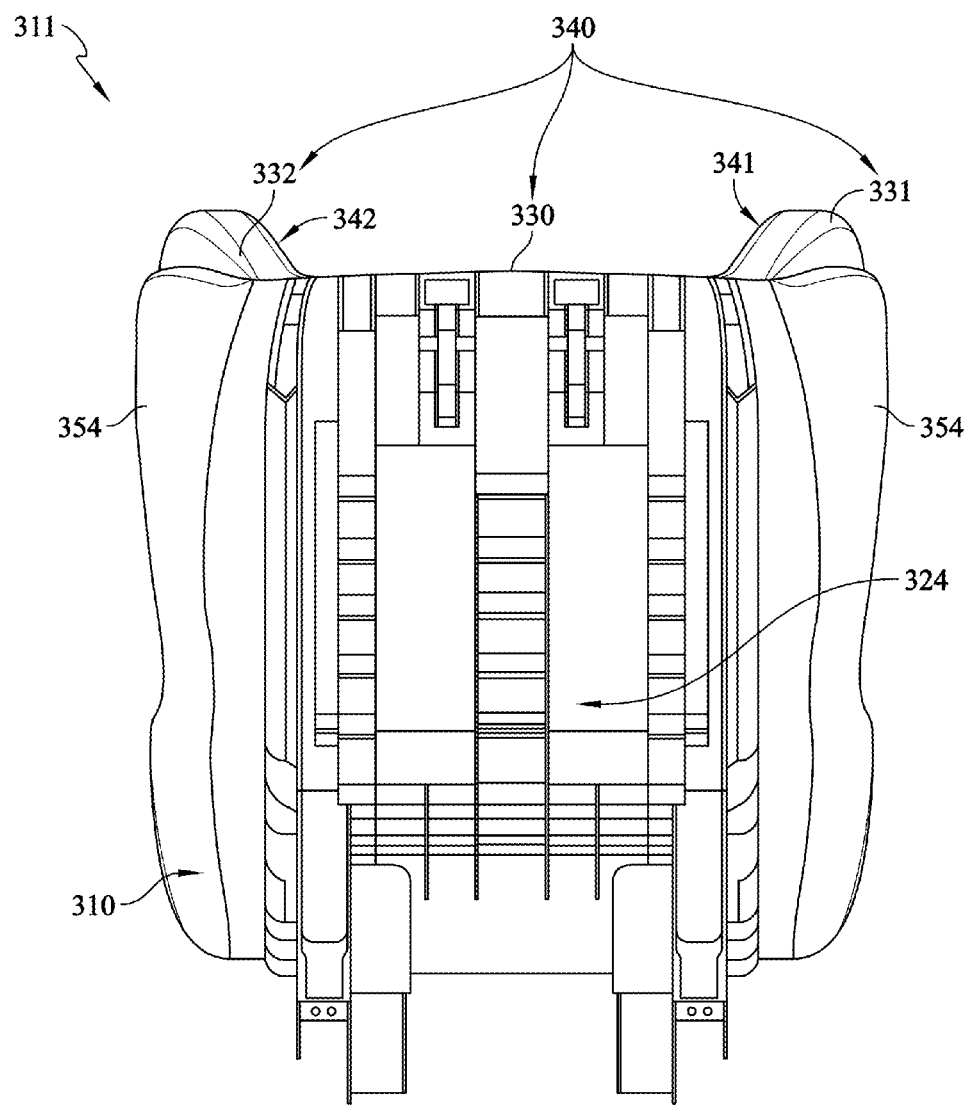
FIG. 25 is a rear view of the child restraint including a juvenile vehicle seat as shown in FIG. 21.

In another illustrative embodiment, energy-dissipation system 340 is also coupled to interior and exterior portions 337, 338 of the third side-wing panel 333 as suggested diagrammatically in FIGS. 22 and 23. First force dissipater 341 of energy-dissipation system 340 is coupled to exterior portion 338 of third side-wing panel 333 as well as to exterior portion 338 of first side-wing panel 331 as suggested in FIG. 22. In illustrative embodiments, energy-dissipation system 340 also includes an interior first force dissipater 341I that is coupled to interior surface 337 of each of first and third side-wing panels 331, 333 as suggested in FIG. 22.

Backrest 324 of seat back 314 also includes a fourth side-wing panel 334 located below and adjacent to the second side-wing panel 332 and adjacent to a second side of the seat bottom 312 as suggested in FIG. 20. An upper portion of the fourth side-wing panel 334 is coupled to a lower portion of the second side-wing panel 332. A portion of fourth side-wing panel 334 is formed to include a second armrest 334A as suggested in FIG. 20. A lower portion of the fourth side-wing panel 334 is coupled to the second side of the seat bottom 312. In one illustrative embodiment, energy-dissipation system 340 is also coupled to exterior portions 338 of the fourth side-wing panel 334.

In another illustrative embodiment, energy-dissipation system 340 is also coupled to interior and exterior portions 337, 338 of the fourth side-wing panel 334. Second force dissipater 342 of energy-dissipation system 340 is coupled to exterior portion 338 of fourth side-wing panel 334 as well as to exterior portion 338 of second side-wing panel 332 as suggested in FIG. 22. In illustrative embodiments, energy-dissipation system 340 also includes an interior second force dissipater 342I that is coupled to interior surface 337 of each of second and fourth side-wing panels 332, 334 as suggested in FIG. 22.

Backrest 324 of back seat 324 also includes a center panel 335 as suggested in FIG. 20. Center panel 335 is arranged to interconnect third and fourth side-wing panels 333, 334 and rear panel 330 of headrest 326 and seat bottom 312.

The ride-down pad 341P, 342P of each force dissipater 341, 342 includes a front surface 350 and a back surface 352. As best seen in FIG. 20, front surface 350 faces outwardly from the juvenile vehicle seat 310 and is defined by the array of crush strips 343. Front surface 350 is adapted to be impacted by an external object during application of an impact force. As shown in the Figures, each force dissipater 341, 342 is covered by a fascia component 354 which may be formed of molded plastic. Fascia 354 serves to protect the array of crush strips 343 from every day wear and tear and also improves the aesthetic appearance of the force dissipaters 341, 342. The back surface 352 of first ride-down pad 341P of first force dissipater 341 is coupled to the first pad foundation 341F mounted on the exterior surface 338 of first side-wing panel 331 as suggested in FIG. 20. The back surface 352 of second ride-down pad 342P of second force dissipater 342 is coupled to the second pad foundation 342F mounted on the exterior surface 338 of second side-wing panel 332.

Figure 26:
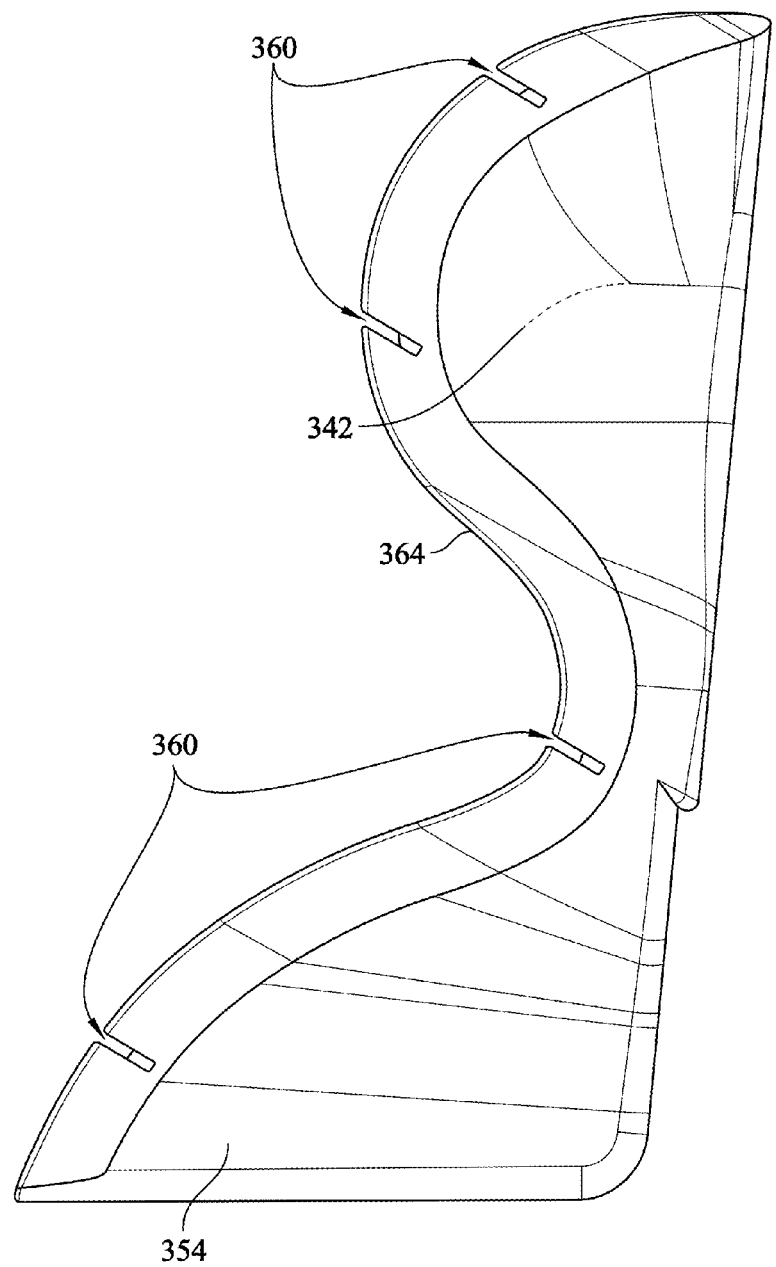
FIG. 26 is a plan view of a fourth force dissipater as shown in the child restraint including a juvenile vehicle seat of FIG. 21.

Any suitable means may be used to couple first and second force dissipaters 341, 342 to exterior surface 338 of each side-wing panel 331, 332. As an example, force dissipaters 341, 342 may be coupled to panels 331, 332 using fasteners such as hook-and-loop fasteners, glue, or any other suitable alternatives. Each of the first and second force dissipaters 341, 342 may also be provided with slits or apertures 360 as best seen in FIG. 26. Apertures 360 shown in FIG. 26 are configured to engage ribs 362 shown in FIG. 20 provided on the shell of juvenile vehicle seat 310 and assist in retaining the first and second force dissipaters 341, 342 in a fixed position relative to the respective side-wing panel 331, 332.

The leading edge 364 of each force dissipater 341, 342 is shaped to match the contours of juvenile vehicle seat 310. The shape of the leading edge 364 may vary depending on the vehicle seat 310 on which force dissipater 341, 342 is being used. All dimensions of the force dissipaters including length and width are also able to be varied as discussed above in relation to the first embodiment.

A first force dissipater 441 in accordance with another embodiment of the present disclosure is illustrated in FIGS. 27-31. First force dissipater 441 is included in an energy-dissipation system 411 and can be mounted on one side of a juvenile vehicle seat of the type shown, for example, in earlier figures in the present disclosure.

Figure 27:
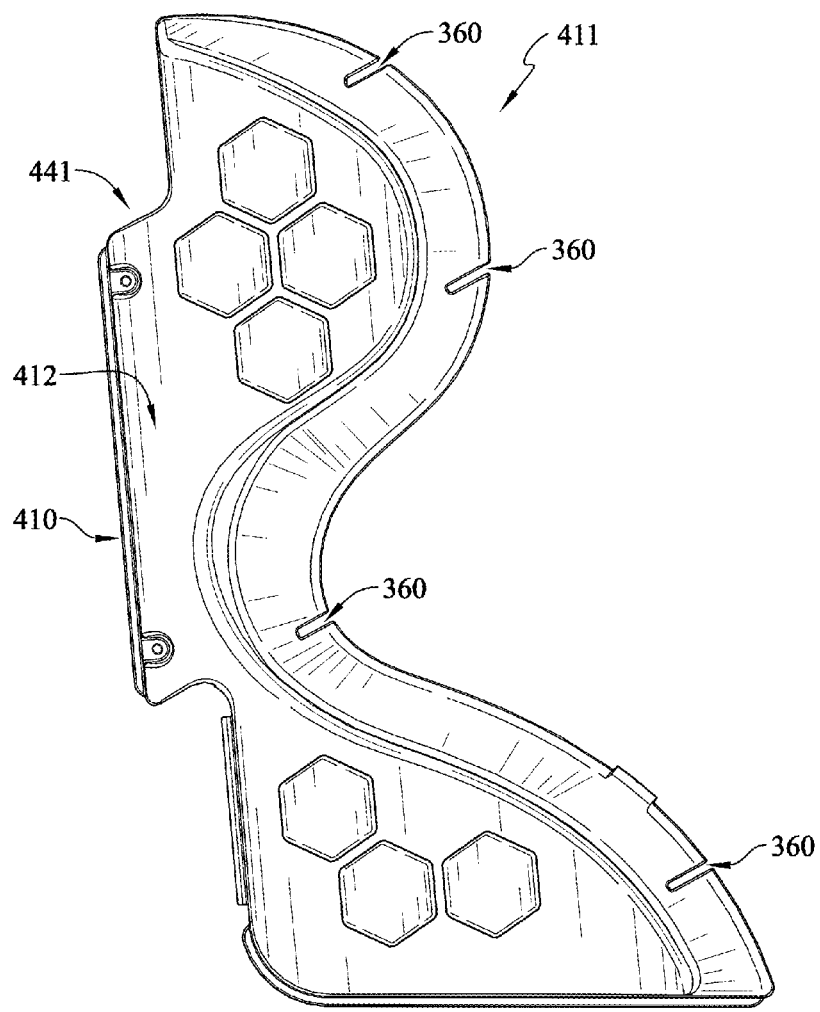
FIGS. 27-31 are illustrations of a monolithic force dissipater in accordance with another embodiment of the present disclosure, which dissipater is suitable for use with the juvenile vehicle seats disclosed herein.
Figure 28:
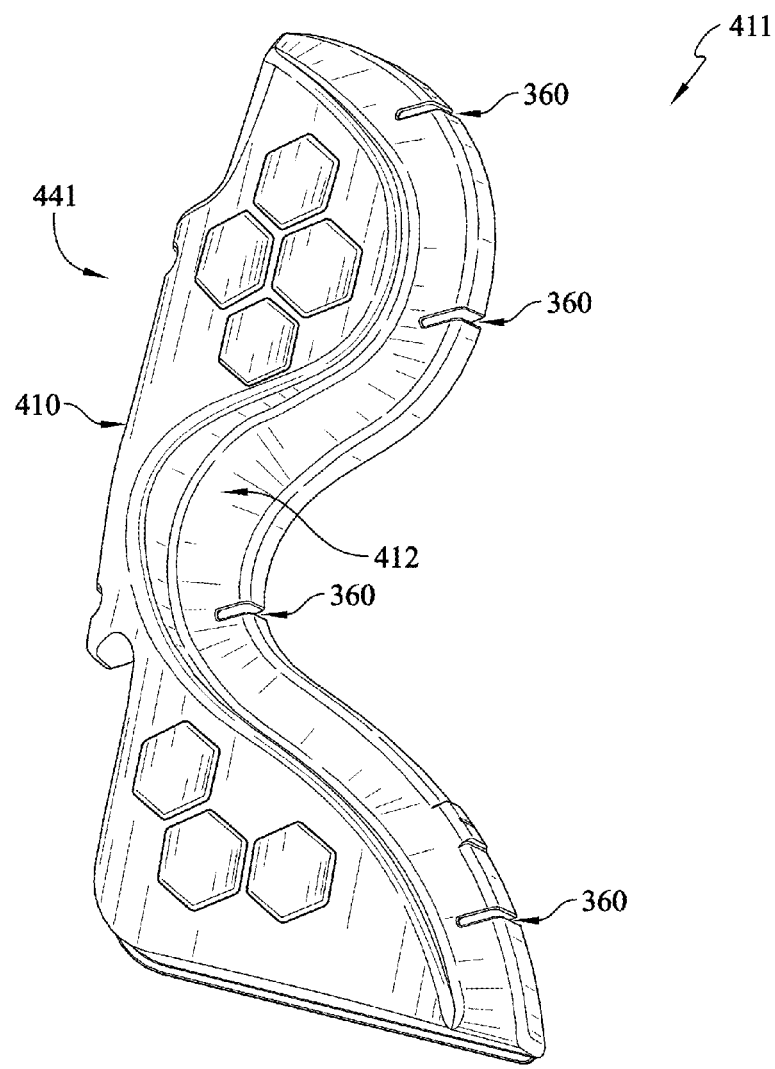
Figure 29:
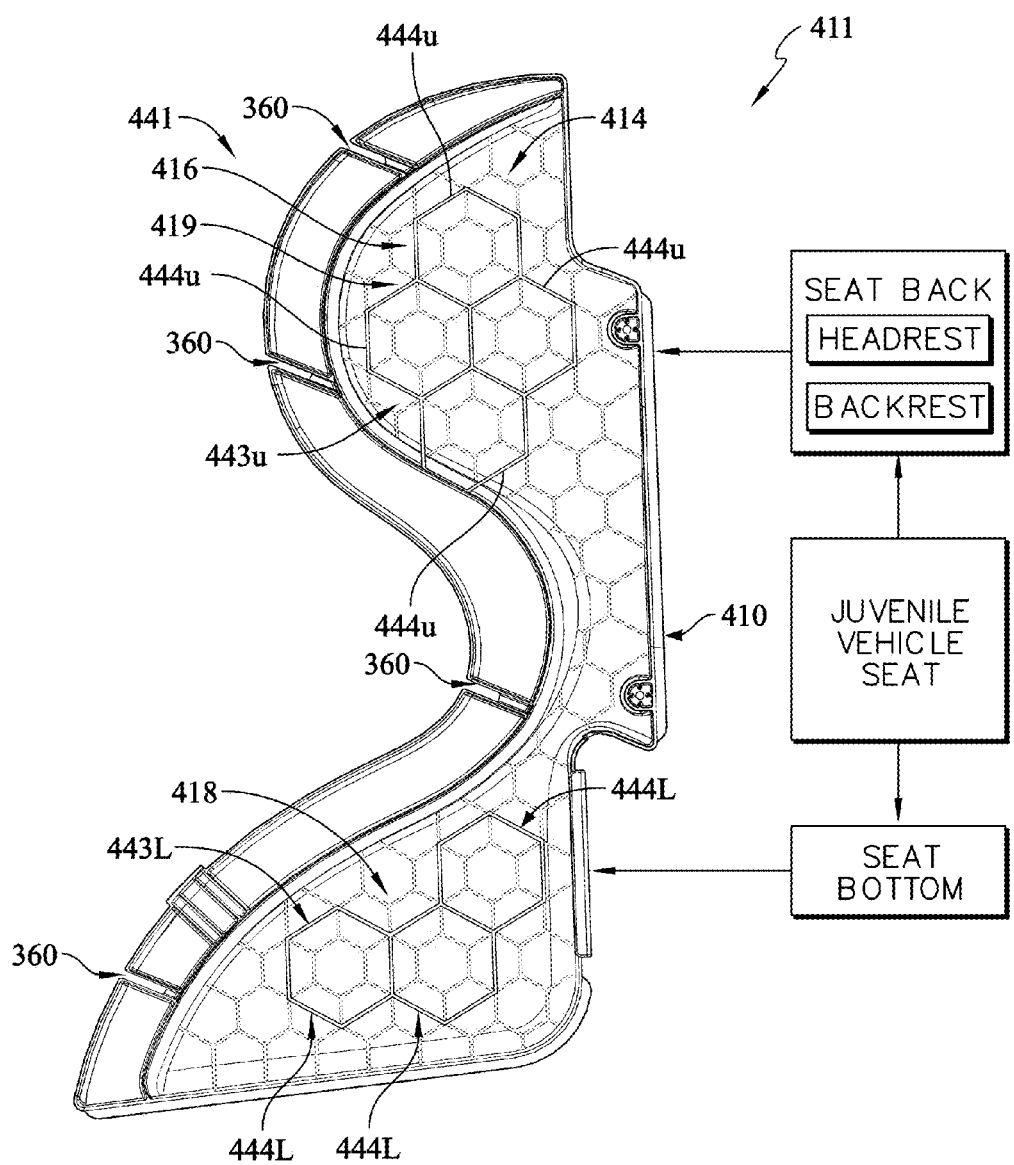

First force dissipater 441 includes a hollow shell 410 having an outer surface 412 and an inner surface 414 as suggested in FIGS. 27 and 29. When first force dissipater 441 is mounted on one side of a juvenile vehicle seat, outer surface 412 faces away from the juvenile vehicle seat and inner surface 414 faces toward the juvenile vehicle seat as suggested in FIG. 31. In illustrative embodiments, inner surface 414 has a generally concave shape to define a hollow interior region 416 bounded by hollow shell 410.

Figure 30:
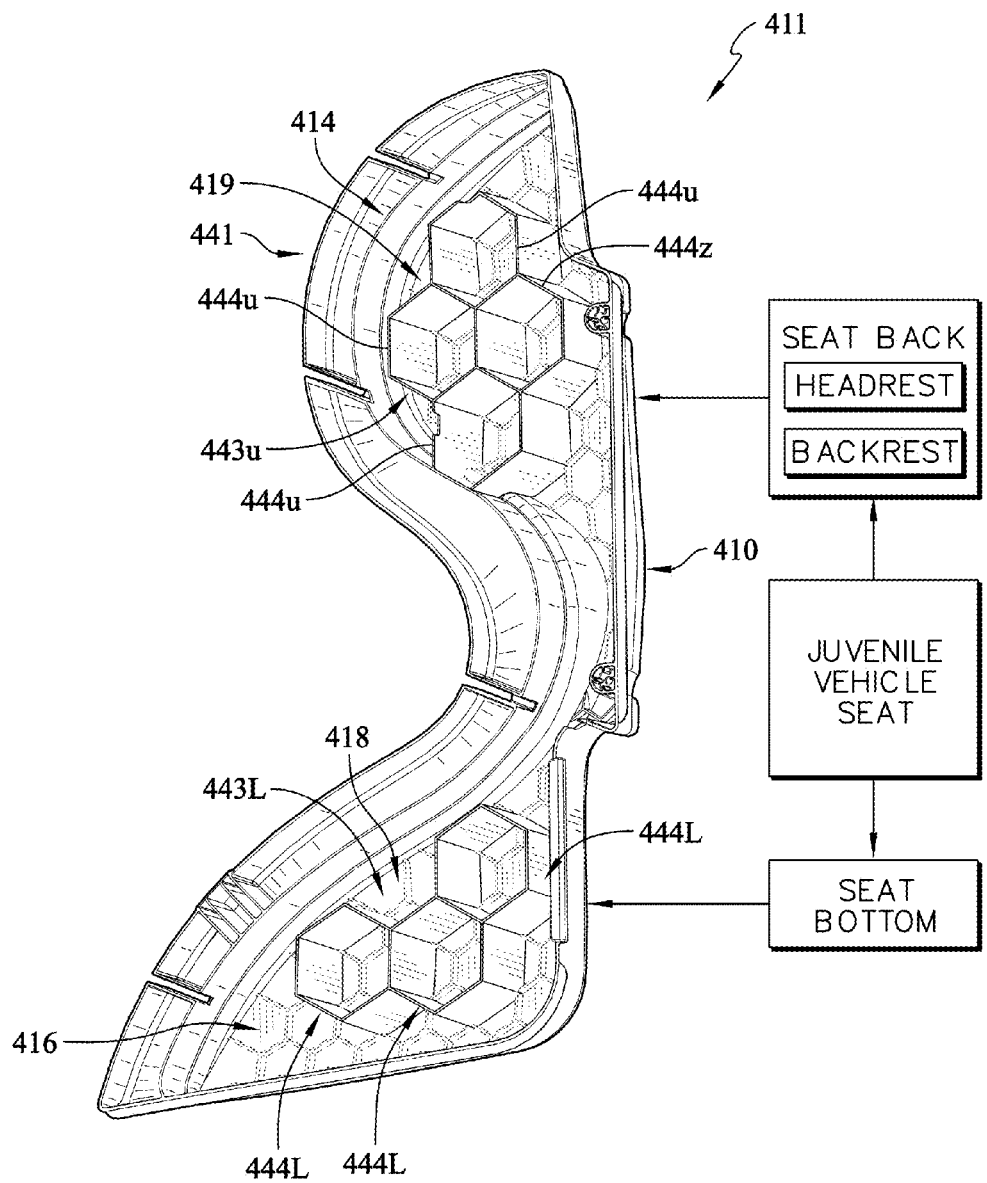
Figure 31:
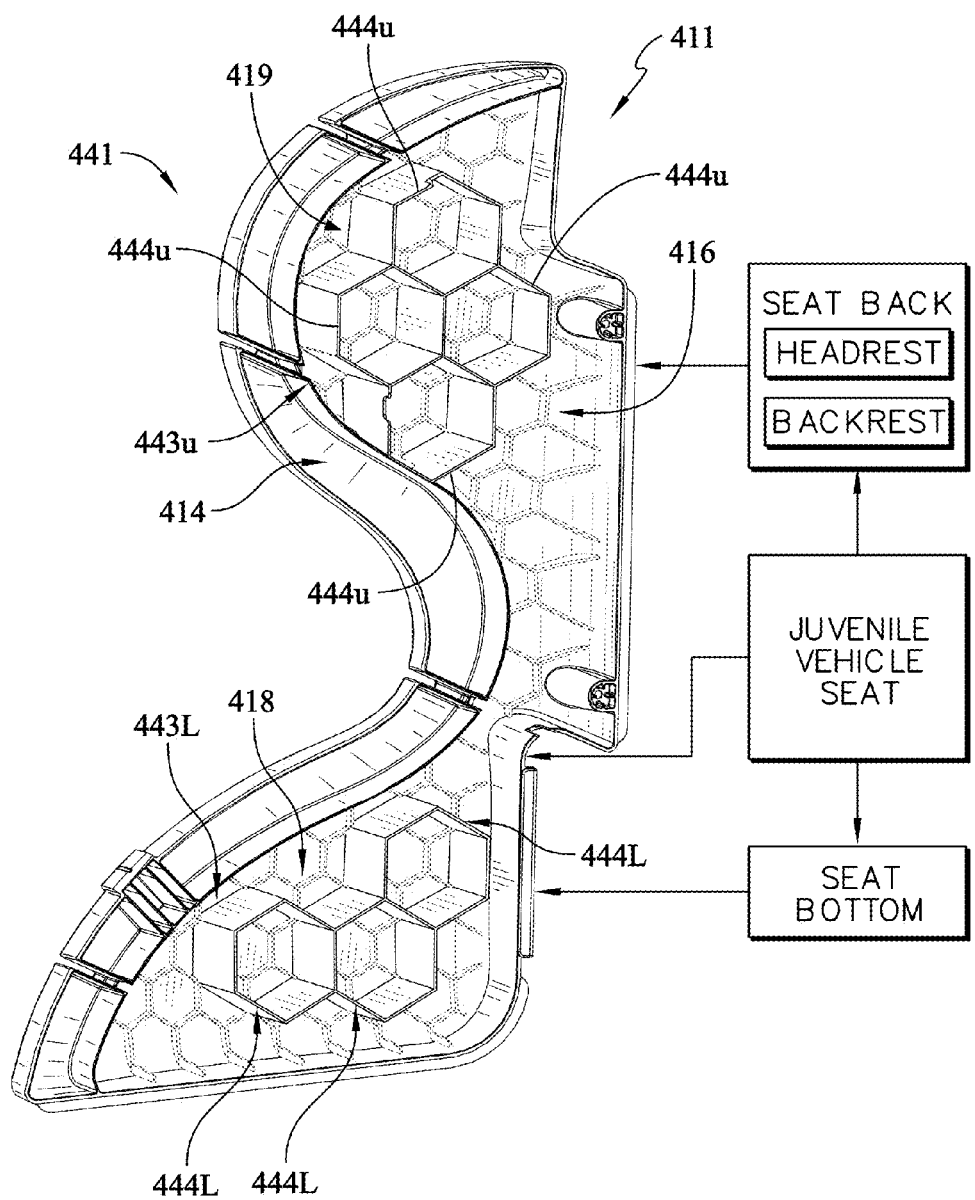

First force dissipater 441 includes a first inwardly projecting crush strip 443L coupled to a lower portion of inner surface 414 of hollow shell 410 associated with a seat bottom of the juvenile vehicle seat as suggested in FIGS. 29-31. In illustrative embodiments, crush strip 443L includes several inwardly projecting polygon-shaped sleeves 444L cantilevered to inner surface 414 and arranged to extend toward the seat bottom of the juvenile vehicle seat when the first force dissipater 441 is mounted on one side of the juvenile vehicle seat. In illustrative embodiments, each sleeve 444L is hexagon-shaped and three sleeves 444L cooperate to form a triangle-shaped array 418 of sleeves 444L as suggested in FIGS. 29-31.

First force dissipater 441 includes a second inwardly projecting crush strip 443U coupled to an upper portion of inner surface 414 of hollow shell 410 associated with a backrest and a headrest of a seat back of the juvenile vehicle seat as suggested in FIGS. 29-31. In illustrative embodiments, crush strip 443U includes several inwardly projecting polygon-shaped sleeves 444U cantilevered to inner surface 414 and arranged to extend toward the seat back of the juvenile vehicle seat when the first force dissipater 441 is mounted on one side of the juvenile vehicle seat. In illustrative embodiments, each sleeve 444U is hexagon-shaped and four sleeves 444U cooperate to form a diamond-shaped array 419 of sleeves 444U as suggested in FIGS. 29-31.

First force dissipater 441 is configured to deform at about a predetermined rate when exposed to a predetermined external impact force. Each crush strip 443L, 443U is made of a suitable crushable designed plastics material. Any suitable means can be used in accordance with the present disclosure to mount first force dissipater 441 on one side of the juvenile vehicle seat. A second force dissipater that is a mirror image of first force dissipater 441 can be mounted on an opposite second side of the juvenile vehicle seat in accordance with the present disclosure to define an energy-dissipation system 411.

The invention claimed is:

1. A child restraint comprising
a juvenile vehicle seat including a seat bottom and a seat back, the seat back including a backrest arranged to extend upwardly away from the seat bottom, a headrest including a rear panel coupled to an upper portion of the backrest, a first side-wing panel coupled to a first side of the rear panel and arranged to extend forwardly away from the rear panel and to lie above the seat bottom, and a second side-wing panel coupled to an opposite second side of the rear panel and arranged to lie in spaced-apart relation to the first side-wing panel to extend forwardly away from the rear panel and to lie above the seat bottom,
wherein each of the rear, first side-wing, and second side-wing panels and the backrest have an interior surface defining an occupant-receiving space and an oppositely facing exterior surface,
wherein an energy-dissipation system is coupled to at least a part of the exterior surface of the first and second side-wing panels,
wherein the energy-dissipation system includes a first force dissipater coupled to an exterior surface of the first side-wing panel and a second force dissipater coupled to an exterior surface of the second-side wing panel, and
wherein the first and second force-dissipaters are each in the form of an array of crush strips and each crush strip of the first and second force-dissipaters includes a series of polygonal structures coupled to one another to establish a crush strip and each polygonal structure is formed to have walls that are arranged to lie generally in perpendicular relation to the exterior surface of an adjacent companion side-wing panel.

2. The child restraint of claim 1, wherein each of the first and second force dissipaters includes a plurality of crush strips and adjacent crush strips are coupled to one another to establish an array of crush strips that is arranged to extend laterally along the exterior surface of the adjacent companion side-wing panel.

3. The child restraint of claim 1, wherein a crush strip includes a series of crush cells coupled to one another and each crush cell is formed to include a crush aperture oriented to open away from the exterior surface of the adjacent companion side-wing panel.

4. The child restraint of claim 3, wherein each crush cell in a crush strip has a polygonal shape.

5. The child restraint of claim 4, wherein each crush cell has a hexagon shape.

6. The child restraint of claim 3, wherein the crush aperture formed in each crush cell opens into a crush space formed in the crush cell and arranged to communicate with the exterior surface of an adjacent companion side-wing panel.

7. The child restraint of claim 3, wherein each crush cell in a crush strip includes a plurality of walls coupled to one another to establish a crush-cell perimeter.

8. The child restraint of claim 3, wherein each crush cell in a crush strip includes a wall that is appended to the exterior surface of an adjacent companion side-wing panel to establish a crush-cell perimeter.

9. The child restraint of claim 3, wherein each crush cell is formed to include a crush aperture opening into a crush space formed in the crush cell.

10. The child restraint of claim 1, wherein the first and second force dissipaters are made from a crushable polymeric foam.

11. The child restraint of claim 1, wherein a ride-down pad included in each force dissipater includes a front surface and a back surface and the front surface is arranged to be impacted by an external object during application of the impact force.

12. The child restraint of claim 11, wherein the front surface of the ride-down pad is defined by an array of crush strips.

13. The child restraint of claim 11, wherein the back surface of the ride-down pad is coupled to a pad foundation.

14. The child restraint of claim 1, wherein the backrest includes a third side-wing panel located below and adjacent to the first side-wing panel, a fourth side-wing panel located below and adjacent to the second side-wing panel, and a center panel arranged to interconnect the third and fourth side-wing panels and lie between the seat bottom and the rear panel of the headrest, and the energy-dissipation system is also coupled to at least a part of the exterior surface of the third and fourth side-wing panels.

15. The child restraint of claim 14, wherein the energy-dissipation system is also coupled to at least a portion of the interior surface of the third and fourth side-wing panels.

16. The child restraint of claim 1, wherein the energy-dissipation system is also coupled to at least a portion of the interior surface of the first and second side-wing panels.

17. A child restraint comprising
a juvenile vehicle seat including a seat bottom and a seat back, the seat back including a backrest arranged to extend upwardly away from the seat bottom, a headrest including a rear panel coupled to an upper portion of the backrest, a first side-wing panel coupled to a first side of the rear panel and arranged to extend forwardly away from the rear panel and to lie above the seat bottom, and a second side-wing panel coupled to an opposite second side of the rear panel and arranged to lie in spaced-apart relation to the first side-wing panel to extend forwardly away from the rear panel and to lie above the seat bottom, wherein each of the rear, first side-wing, and second side-wing panels and the backrest have an interior surface defining an occupant-receiving space and an oppositely facing exterior surface, wherein an energy-dissipation system is coupled to at least a part of the exterior surface of the first and second side-wing panels, wherein the backrest includes a third side-wing panel located below and adjacent to the first side-wing panel, a fourth side-wing panel located below and adjacent to the second side-wing panel, and a center panel arranged to interconnect the third and fourth side-wing panels and lie between the seat bottom and the rear panel of the headrest, and the energy-dissipation system is also coupled to at least apart of the exterior surface of the third and fourth side-wing panels, wherein the energy-dissipation system includes a first force dissipater coupled to exterior surfaces of the first and third side-wing panels and configured to include a first ride-down pad including at least one crush strip including a series of polygonal structures arranged to extend laterally across companion exterior surface, and a first pad foundation mounted on exterior surfaces and coupled to the first ride-down pad of the first and third side-wing panels and a second force dissipater coupled to exterior surfaces of the second and fourth side-wing panels and configured to include a second ride-down pad including at least one crush strip comprising a series of polygonal structures arranged to extend laterally across companion exterior structures and a second pad foundation mounted on exterior surfaces of the second and fourth side-wing panels and coupled to the second ride-down pad, and each polygonal structure is formed to have walls that are arranged to lie generally in perpendicular relation to the exterior surface of an adjacent companion side-wing panel.

18. The child restraint of claim 17, wherein the third side-wing panel includes a first armrest and the fourth side-wing panel includes a second armrest.

19. A child restraint comprising
a juvenile vehicle seat including a seat bottom and a seat back, the seat back including a backrest arranged to extend upwardly away from the seat bottom, a headrest including a rear panel coupled to an upper portion of the backrest, a first side-wing panel coupled to a first side of the rear panel and arranged to extend forwardly away from the rear panel and to lie above the seat bottom, and a second side-wing panel coupled to an opposite second side of the rear panel and arranged to lie in spaced-apart relation to the first side-wing panel to extend forwardly away from the rear panel and to lie above the seat bottom, wherein each of the rear, first side-wing, and second side-wing panels and the backrest have an interior surface defining an occupant-receiving space and an oppositely facing exterior surface, wherein an energy-dissipation system is coupled to at least a part of the exterior surface of the first and second side-wing panels, and wherein the energy-dissipation system includes a first force dissipater having a hollow shell coupled to an exterior surface of the first side-wing panel to form a hollow interior region therebetween and a crush strip cantilevered to an inner surface arranged to face toward the first side-wing panel and arranged to extend inwardly toward the first side-wing panel.

20. The child restraint of claim 19, wherein the crush strip includes several inwardly projecting polygon-shaped sleeves cantilevered to the inner surface of the hollow shell and arranged to extend toward the seat back of the juvenile vehicle seat.

21. The child restraint of claim 20, wherein the hollow shell and the polygon-shaped sleeves cooperate to form a monolithic element made of a plastics material.

22. The child restrain of claim 20, wherein there are three polygon-shaped sleeves that cooperate to form a triangle-shaped array of polygon-shaped sleeves.

23. The child restraint of claim 1, wherein the backrest includes a third side-wing panel located below and adjacent to the first side-wing panel, a fourth side-wing panel located below and adjacent to the second side-wing panel, and a center panel arranged to interconnect the third and fourth side-wing panels and lie between the seat bottom and the rear panel of the headrest, and the energy-dissipation system is also coupled to at least a part of the exterior surface of the third and fourth side-wing panels and wherein the energy-dissipation system includes a first force dissipater having a hollow shell coupled to an exterior surface of the third side-wing panel to form a hollow interior region therebetween and a crush strip cantilevered to an inner surface arranged to face toward the third side-wing panel and arranged to extend inwardly toward the third side-wing panel.

24. A child restraint comprising
a juvenile vehicle seat including a seat bottom and a seat back, the seat back including a backrest arranged to extend upwardly away from the seat bottom, a headrest including a rear panel coupled to an upper portion of the backrest, a first side-wing panel coupled to a first side of the rear panel and arranged to extend forwardly away from the rear panel and to lie above the seat bottom, and a second side-wing panel coupled to an opposite second side of the rear panel and arranged to lie in spaced-apart relation to the first side-wing panel to extend forwardly away from the rear panel and to lie above the seat bottom, wherein each of the rear, first side-wing, and second side-wing panels and the backrest have an interior surface defining an occupant-receiving space and an oppositely facing exterior surface, wherein an energy-dissipation system is coupled to at least a part of the exterior surface of the first and second side-wing panels, wherein the backrest includes a third side-wing panel located below and adjacent to the first side-wing panel, a fourth side-wing panel located below and adjacent to the second side-wing panel, and a center panel arranged to interconnect the third and fourth side-wing panels and lie between the seat bottom and the rear panel of the headrest, and the energy-dissipation system is also coupled to at least a part of the exterior surface of the third and fourth side-wing panels and wherein the energy-dissipation system includes a first force dissipater having a hollow shell coupled to an exterior surface of the third side-wing panel to form a hollow interior region therebetween and a crush strip cantilevered to an inner surface arranged to face toward the third side-wing panel and arranged to extend inwardly toward the third side-wing panel, and wherein the crush strip includes several inwardly projecting polygon-shaped sleeves cantilevered to the inner surface of the hollow shell and arranged to extend toward the seat bottom of the juvenile vehicle seat.

25. The child restraint of claim 24, wherein the hollow shell and the polygon-shaped sleeves cooperate to form a monolithic element made of a plastics material.

26. The child restraint of claim 24, wherein there are three polygon-shaped sleeves that cooperate to form a triangle-shaped array of polygon-shaped sleeves.

27. A child restraint comprising a juvenile vehicle seat including a seat bottom and a seat back, the seat back including a backrest arranged to extend upwardly away from the seat bottom, a headrest including a rear panel, a first side-wing panel coupled to the rear panel to extend forwardly away from the rear panel and to lie above the seat bottom, and a second side-wing panel coupled to the rear panel and arranged to lie in spaced-apart relation to the first side-wing panel to extend forwardly away from the rear panel and to lie above the seat bottom, wherein each of the rear, first side-wing, and second side-wing panels and the backrest have an interior surface defining an occupant-receiving space and an oppositely facing exterior surface, and wherein an energy-dissipation system is coupled to at least a part of the interior and exterior surfaces of the first and second side-wing panels with the energy-dissipation system including a series of polygonal structures and each polygonal structure is formed to have walls that are arranged to lie generally in perpendicular relation to the exterior surface of an adjacent companion side-wing panel.

28. The child restraint according to claim 27, wherein the energy-dissipation system includes a plurality of force dissipaters each coupled to a respective interior or exterior surface of the juvenile vehicle seat.

29. The child restraint of claim 28, wherein the plurality of force-dissipaters are each in the form of an array of crush strips and each crush strip of the force-dissipaters includes a series of polygonal structures coupled to one another to establish a crush strip.

30. The child restraint of claim 29, wherein each force dissipater includes a plurality of crush strips and adjacent crush strips are coupled to one another to establish an array of crush strips.

31. The child restraint of claim 29, wherein a crush strip includes a series of crush cells coupled to one another.

32. The child restraint of claim 31, wherein each crush cell in a crush strip has a polygonal shape.

33. The child restraint of claim 32, wherein each crush cell has a hexagon shape.

34. The child restraint of claim 31, wherein each crush cell is formed to include a crush aperture opening into a crush space formed in the crush cell.

35. The child restraint of claim 31, wherein the plurality of force dissipaters are made from a crushable polymeric foam.

36. The child restraint of claim 31, wherein each crush cell in a crush strip includes a plurality of walls coupled to one another to establish a crush-cell perimeter.

37. The child restraint of claim 31, wherein each crush cell in a crush strip includes a wall to establish a crush-cell perimeter.

38. The child restraint of claim 31, wherein each crush cell is formed to include a crush aperture opening into a crush space formed in the crush cell.

39. The child restraint of claim 28, wherein each force dissipater includes a front surface and a back surface and the front surface is arranged to be impacted by an object during application of the impact force.

40. The child restraint of claim 39, wherein the front surface is defined by an array of crush strips.

* * * * *